(12) United States Patent
Davis et al.

(10) Patent No.: US 9,075,655 B2
(45) Date of Patent: Jul. 7, 2015

(54) SYSTEM AND METHOD FOR HIGH-PERFORMANCE, LOW-POWER DATA CENTER INTERCONNECT FABRIC WITH BROADCAST OR MULTICAST ADDRESSING

(71) Applicant: III Holdings 2, LLC, Wilmington, DE (US)

(72) Inventors: Mark Davis, Austin, TX (US); David James Borland, Austin, TX (US)

(73) Assignee: III Holdings 2, LLC, Wilmington, DE (US)

( * ) Notice: Subject to any disclaimer, the term of this patent is extended or adjusted under 35 U.S.C. 154(b) by 0 days.

(21) Appl. No.: 13/624,731

(22) Filed: Sep. 21, 2012

(65) Prior Publication Data
US 2013/0022040 A1    Jan. 24, 2013

Related U.S. Application Data

(62) Division of application No. 12/794,996, filed on Jun. 7, 2010.

(60) Provisional application No. 61/256,723, filed on Oct. 30, 2009.

(51) Int. Cl.
*H04L 12/64* (2006.01)
*G06F 9/50* (2006.01)
(Continued)

(52) U.S. Cl.
CPC .......... *G06F 9/5016* (2013.01); *H04L 45/7457* (2013.01); *H04L 45/60* (2013.01);
(Continued)

(58) Field of Classification Search
CPC ....... H04L 49/00; H04L 49/10; H04L 49/109; H04L 49/15; H04L 49/201; H04L 49/25; H04L 49/256; H04L 49/258; H04L 49/30; H04L 49/3009; H04L 49/309; H04L 49/60; H04L 45/00; H04L 45/60; H04L 45/72; H04L 45/74; H04L 45/745; H04L 61/00; H04L 61/60; H04L 61/6004
USPC ............ 370/351–430; 709/238–244; 711/108
See application file for complete search history.

(56) References Cited

U.S. PATENT DOCUMENTS 5,451,936 A    9/1995   Yang et al.
5,594,908 A    1/1997   Hyatt
(Continued)

FOREIGN PATENT DOCUMENTS

JP    2005-223753    8/2005
JP    2005-536960   12/2005
(Continued)

OTHER PUBLICATIONS

Deering, "IP Multicast Extensions for 4.3BSD UNIX and related systems," 1989, http://www4.ncsu.edu/~rhee/clas/csc495j/mcast.api.txt.*

(Continued)

*Primary Examiner* — Thai Hoang
*Assistant Examiner* — Kenneth P Hunt

(57) ABSTRACT

A system and method are provided that support a routing using a tree-like or graph topology that supports multiple links per node, where each link is designated as an Up, Down, or Lateral link, or both, within the topology. The system may use a segmented MAC architecture which may have a method of re-purposing MAC IP addresses for inside MACs and outside MACs, and leveraging what would normally be the physical signaling for the MAC to feed into the switch.

20 Claims, 11 Drawing Sheets

(51) Int. Cl.

| | | |
|---|---|---|
| H04L 12/743 | (2013.01) | |
| H04L 12/773 | (2013.01) | |
| H04L 12/933 | (2013.01) | |
| H04L 12/935 | (2013.01) | |
| H04L 12/931 | (2013.01) | |
| H04L 12/701 | (2013.01) | |
| H04L 12/947 | (2013.01) | |
| G06F 13/24 | (2006.01) | |
| G06F 1/32 | (2006.01) | |
| G06F 13/40 | (2006.01) | |
| G06F 13/00 | (2006.01) | |
| H04L 12/801 | (2013.01) | |

(52) U.S. Cl.
CPC ......... *H04L 49/109* (2013.01); *H04L 49/3009* (2013.01); *H04L 49/351* (2013.01); *H04L 49/356* (2013.01); *H04L 45/00* (2013.01); *H04L 49/25* (2013.01); *G06F 13/24* (2013.01); *G06F 1/3234* (2013.01); *G06F 13/40* (2013.01); *G06F 13/00* (2013.01); *H04L 47/10* (2013.01); *Y02B 60/44* (2013.01)

(56) References Cited

U.S. PATENT DOCUMENTS

| | | | |
|---|---|---|---|
| 5,623,641 | A | 4/1997 | Kadoyashiki |
| 5,781,187 | A | 7/1998 | Gephardt et al. |
| 5,901,048 | A | 5/1999 | Hu |
| 5,908,468 | A | 6/1999 | Hartmann |
| 5,968,176 | A | 10/1999 | Nessett et al. |
| 5,971,804 | A | 10/1999 | Gallagher et al. |
| 6,141,214 | A | 10/2000 | Ahn |
| 6,181,699 | B1 * | 1/2001 | Crinion et al. ............... 370/392 |
| 6,192,414 | B1 | 2/2001 | Horn |
| 6,252,878 | B1 | 6/2001 | Locklear et al. |
| 6,314,501 | B1 | 11/2001 | Gulick et al. |
| 6,373,841 | B1 | 4/2002 | Goh et al. |
| 6,446,192 | B1 | 9/2002 | Narasimhan et al. |
| 6,452,809 | B1 | 9/2002 | Jackson et al. |
| 6,507,586 | B1 * | 1/2003 | Satran et al. ............... 370/432 |
| 6,574,238 | B1 * | 6/2003 | Thrysoe ............... 370/466 |
| 6,711,691 | B1 | 3/2004 | Howard et al. |
| 6,766,389 | B2 | 7/2004 | Hayter et al. |
| 6,813,676 | B1 | 11/2004 | Henry et al. |
| 6,816,750 | B1 | 11/2004 | Klaas |
| 6,842,430 | B1 | 1/2005 | Melnik |
| 6,857,026 | B1 | 2/2005 | Cain |
| 6,963,926 | B1 | 11/2005 | Robinson |
| 6,963,948 | B1 | 11/2005 | Gulick |
| 6,977,939 | B2 * | 12/2005 | Joy et al. ............... 370/401 |
| 6,988,170 | B2 | 1/2006 | Barroso et al. |
| 6,990,063 | B1 | 1/2006 | Lenoski et al. |
| 7,020,695 | B1 | 3/2006 | Kundu et al. |
| 7,032,119 | B2 | 4/2006 | Fung |
| 7,080,078 | B1 | 7/2006 | Slaughter et al. |
| 7,080,283 | B1 | 7/2006 | Songer et al. |
| 7,143,153 | B1 | 11/2006 | Black et al. |
| 7,165,120 | B1 | 1/2007 | Giles et al. |
| 7,170,315 | B2 | 1/2007 | Bakker et al. |
| 7,203,063 | B2 | 4/2007 | Bash et al. |
| 7,257,655 | B1 | 8/2007 | Burney et al. |
| 7,263,288 | B1 | 8/2007 | Islam |
| 7,274,705 | B2 | 9/2007 | Chang et al. |
| 7,278,582 | B1 | 10/2007 | Siegel et al. |
| 7,310,319 | B2 | 12/2007 | Awsienko et al. |
| 7,325,050 | B2 | 1/2008 | O'Connor et al. |
| 7,337,333 | B2 | 2/2008 | O'Conner et al. |
| 7,340,777 | B1 | 3/2008 | Szor |
| 7,353,362 | B2 | 4/2008 | Georgiou et al. |
| 7,382,154 | B2 | 6/2008 | Ramos et al. |
| 7,386,888 | B2 | 6/2008 | Liang et al. |
| 7,418,534 | B2 | 8/2008 | Hayter et al. |
| 7,437,540 | B2 | 10/2008 | Paolucci et al. |
| 7,447,147 | B2 | 11/2008 | Nguyen et al. |
| 7,447,197 | B2 | 11/2008 | Terrell et al. |
| 7,466,712 | B2 | 12/2008 | Makishima et al. |
| 7,467,306 | B2 | 12/2008 | Cartes et al. |
| 7,467,358 | B2 | 12/2008 | Kang et al. |
| 7,502,884 | B1 | 3/2009 | Shah et al. |
| 7,519,843 | B1 | 4/2009 | Buterbaugh et al. |
| 7,555,666 | B2 | 6/2009 | Brundridge et al. |
| 7,583,661 | B2 | 9/2009 | Chaudhuri |
| 7,586,841 | B2 | 9/2009 | Vasseur |
| 7,596,144 | B2 | 9/2009 | Pong |
| 7,599,360 | B2 * | 10/2009 | Edsall et al. ............... 370/389 |
| 7,606,225 | B2 | 10/2009 | Xie et al. |
| 7,606,245 | B2 | 10/2009 | Ma et al. |
| 7,616,646 | B1 | 11/2009 | Ma et al. |
| 7,620,057 | B1 | 11/2009 | Aloni et al. |
| 7,657,677 | B2 | 2/2010 | Huang et al. |
| 7,657,756 | B2 | 2/2010 | Hall |
| 7,660,922 | B2 | 2/2010 | Harriman |
| 7,673,164 | B1 * | 3/2010 | Agarwal ............... 713/324 |
| 7,710,936 | B2 | 5/2010 | Morales Barroso |
| 7,719,834 | B2 | 5/2010 | Miyamoto et al. |
| 7,751,433 | B2 | 7/2010 | Dollo et al. |
| 7,760,720 | B2 | 7/2010 | Pullela et al. |
| 7,761,687 | B2 | 7/2010 | Blumrich et al. |
| 7,783,910 | B2 | 8/2010 | Felter et al. |
| 7,791,894 | B2 | 9/2010 | Bechtolsheim |
| 7,792,113 | B1 | 9/2010 | Foschiano et al. |
| 7,796,399 | B2 | 9/2010 | Clayton et al. |
| 7,801,132 | B2 | 9/2010 | Ofek et al. |
| 7,802,017 | B2 | 9/2010 | Uemura et al. |
| 7,831,839 | B2 | 11/2010 | Hatakeyama |
| 7,840,703 | B2 | 11/2010 | Arimilli et al. |
| 7,865,614 | B2 | 1/2011 | Lu et al. |
| 7,925,795 | B2 | 4/2011 | Tamir et al. |
| 7,975,110 | B1 | 7/2011 | Spaur et al. |
| 7,991,817 | B2 | 8/2011 | Dehon et al. |
| 7,991,922 | B2 | 8/2011 | Hayter et al. |
| 7,992,151 | B2 | 8/2011 | Warrier et al. |
| 8,019,832 | B2 | 9/2011 | De Sousa et al. |
| 8,060,760 | B2 | 11/2011 | Shetty et al. |
| 8,060,775 | B1 | 11/2011 | Sharma et al. |
| 8,082,400 | B1 | 12/2011 | Chang et al. |
| 8,108,508 | B1 | 1/2012 | Goh et al. |
| 8,122,269 | B2 | 2/2012 | Houlihan et al. |
| 8,132,034 | B2 | 3/2012 | Lambert et al. |
| 8,156,362 | B2 | 4/2012 | Branover et al. |
| 8,165,120 | B2 | 4/2012 | Maruccia et al. |
| 8,170,040 | B2 | 5/2012 | Konda |
| 8,180,996 | B2 | 5/2012 | Fullerton et al. |
| 8,189,612 | B2 | 5/2012 | Lemaire et al. |
| 8,199,636 | B1 | 6/2012 | Rouyer et al. |
| 8,205,103 | B2 | 6/2012 | Kazama et al. |
| 8,379,425 | B2 | 2/2013 | Fukuoka et al. |
| 8,397,092 | B2 | 3/2013 | Karnowski |
| 8,599,863 | B2 | 12/2013 | Davis |
| 8,684,802 | B1 | 4/2014 | Gross et al. |
| 8,745,275 | B2 | 6/2014 | Ikeya et al. |
| 8,745,302 | B2 | 6/2014 | Davis et al. |
| 8,782,321 | B2 | 7/2014 | Harriman et al. |
| 8,824,485 | B2 | 9/2014 | Biswas et al. |
| 8,854,831 | B2 | 10/2014 | Arnouse |
| 2002/0004912 | A1 | 1/2002 | Fung |
| 2002/0040391 | A1 | 4/2002 | Chaiken et al. |
| 2002/0083352 | A1 | 6/2002 | Fujimoto et al. |
| 2002/0097732 | A1 * | 7/2002 | Worster et al. ............... 370/408 |
| 2002/0107903 | A1 | 8/2002 | Richter et al. |
| 2002/0124128 | A1 | 9/2002 | Qiu |
| 2002/0159452 | A1 | 10/2002 | Foster et al. |
| 2002/0186656 | A1 | 12/2002 | Vu |
| 2002/0194412 | A1 | 12/2002 | Bottom |
| 2003/0007493 | A1 | 1/2003 | Oi et al. |
| 2003/0033547 | A1 | 2/2003 | Larson et al. |
| 2003/0041266 | A1 | 2/2003 | Ke et al. |
| 2003/0076832 | A1 | 4/2003 | Ni |
| 2003/0093255 | A1 | 5/2003 | Freyensee et al. |
| 2003/0093624 | A1 | 5/2003 | Arimilli et al. |
| 2003/0110262 | A1 | 6/2003 | Hasan et al. |
| 2003/0140190 | A1 | 7/2003 | Mahony et al. |

(56) References Cited

U.S. PATENT DOCUMENTS

| | | |
|---|---|---|
| 2003/0158940 A1 | 8/2003 | Leigh |
| 2003/0159083 A1* | 8/2003 | Fukuhara et al. ............... 714/11 |
| 2003/0172191 A1 | 9/2003 | Williams |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0030938 A1 | 2/2004 | Barr et al. |
| 2004/0068676 A1 | 4/2004 | Larson et al. |
| 2004/0111612 A1* | 6/2004 | Choi et al. ................... 713/163 |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0240688 A1 | 10/2005 | Moerman et al. |
| 2006/0013218 A1 | 1/2006 | Shore et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0076653 A1* | 4/2007 | Park et al. ..................... 370/328 |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0180310 A1 | 8/2007 | Johnson et al. |
| 2007/0226795 A1 | 9/2007 | Conti et al. |
| 2007/0280230 A1* | 12/2007 | Park ............................. 370/390 |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0186965 A1 | 8/2008 | Zheng et al. |
| 2008/0193882 A1 | 8/2008 | Endo et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0064287 A1 | 3/2009 | Bagepalli et al. |
| 2009/0080428 A1 | 3/2009 | Witkowski et al. |
| 2009/0097200 A1 | 4/2009 | Sharma et al. |
| 2009/0113130 A1 | 4/2009 | He et al. |
| 2009/0133129 A1* | 5/2009 | Jeong et al. ..................... 726/27 |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0219827 A1 | 9/2009 | Chen et al. |
| 2009/0222884 A1 | 9/2009 | Shaji et al. |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2010/0005331 A1 | 1/2010 | Somasundaram et al. |
| 2010/0008038 A1 | 1/2010 | Coglitore |
| 2010/0008365 A1* | 1/2010 | Porat ............................. 370/392 |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1 | 5/2010 | Ohtani |
| 2010/0125915 A1 | 5/2010 | Hall et al. |
| 2010/0138481 A1 | 6/2010 | Behrens |
| 2010/0161909 A1 | 6/2010 | Nation et al. |
| 2010/0165983 A1 | 7/2010 | Aybay et al. |
| 2010/0169479 A1 | 7/2010 | Jeong et al. |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1* | 2/2011 | Saltsidis et al. ............... 370/228 |
| 2011/0029652 A1 | 2/2011 | Chhuor et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0320690 A1 | 12/2011 | Petersen et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |

(56) References Cited

U.S. PATENT DOCUMENTS

| | | | |
|---|---|---|---|
| 2012/0198252 | A1 | 8/2012 | Kirschtein et al. |
| 2012/0297042 | A1 | 11/2012 | Davis et al. |
| 2013/0010639 | A1 | 1/2013 | Armstrong et al. |
| 2013/0094499 | A1 | 4/2013 | Davis et al. |
| 2013/0097448 | A1 | 4/2013 | Davis et al. |
| 2013/0148667 | A1 | 6/2013 | Hama et al. |
| 2013/0163605 | A1 | 6/2013 | Chandra et al. |
| 2013/0290650 | A1 | 10/2013 | Chang et al. |
| 2015/0039840 | A1 | 2/2015 | Chandra et al. |

FOREIGN PATENT DOCUMENTS

| | | |
|---|---|---|
| WO | WO-2004/021641 | 3/2004 |
| WO | WO-2005/013143 | 2/2005 |
| WO | WO-2008/000193 | 1/2008 |
| WO | WO2008/000193 | 1/2008 |
| WO | WO-2011/044271 | 4/2011 |
| WO | WO-2012/037494 | 3/2012 |

OTHER PUBLICATIONS

Venaas, "IPv4 Multicast Address Space Registry," 2013,http://www.iana.org/assignments/multicast-addresses/multicast-addresses.xhtml.*
PCT/US2010/053227 International Preliminary Report on Patentability dated May 10, 2012 (2 pages).
PCT/US2010/053227 Written Opinion dated Dec. 16, 2010 (8 pages).
PCT International Search Report of PCT/US10/53227; dated Dec. 16, 2010.
PCT International Search Report of PCT/US12/38987; dated Aug. 16, 2012.
PCT Written Opinion of the International Search Authority of PCT/US12/38987; dated Aug. 16, 2012.
Extended European Search Report of EP 10827330.1; dated Jun. 5, 2013.
Elghany et al., "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communications, Computers and Signal Processing, Aug. 2005, pp. 613-616.
Non-Final Office Action on U.S. Appl. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 13/527,505, mailed Dec. 5, 2014.
Non-Final Office Action on U.S. Appl. No. 13/234,054, mailed Oct. 23, 2014.
Non-Final Office Action on U.S. Appl. No. 13/662,759, mailed Nov. 6, 2014.
Final Office Action on U.S. Appl. No. 13/527,498, mailed Nov. 17, 2014.
Notice of Allowance on U.S. Appl. No. 13/705,340, mailed Dec. 3, 2014.
Advanced Switching Technology Tech Brief, published 2005, 2 pages.
Chapter 1 Overview of the Origin Family Architecture from Origin and Onyx2 Theory of Operations Manual, published 1997, 18 pages.
Cisco MDS 9000 Family Multiprotocol Services Module, published 2006, 13 pages.
Comparing the I2C Bus to the SMBUS, Maxim Integrated, Dec. 1, 2000, p. 1.
Final Office Action on U.S. Appl. No. 12/889,721, mailed Apr. 17, 2014.
Final Office Action on U.S. Appl. No. 12/794,996, mailed Jun. 19, 2013.
Final Office Action on U.S. Appl. No. 13/624,725, mailed Nov. 13, 2013.
Final Office Action on U.S. Appl. No. 13/705,340, mailed Aug. 2, 2013.
Final Office Action on U.S. Appl. No. 13/705,414, mailed Aug. 9, 2013.
fpga4fun.com,"What is JTAG?", 2 pages, Jan. 31, 2010.
From AT to BTX: Motherboard Form Factor, Webopedia, Apr. 29, 2005, p. 1.
HP Virtual Connect Traffic Flow—Technology brief, Jan. 2012, 22 pages.
International Preliminary Report on Patentability for PCT/US2009/044200, mailed Nov. 17, 2010.
International Preliminary Report on Patentability for PCT/US2012/038986 issued on Nov. 26, 2013.
International Preliminary Report on Patentability for PCT/US2012/061747, mailed Apr. 29, 2014.
International Preliminary Report on Patentability issued on PCT/US12/62608, issued May 6, 2014.
International Search Report and Written Opinion for PCT/US12/61747, mailed Mar. 1, 2013.
International Search Report and Written Opinion for PCT/US12/62608, mailed Jan. 18, 2013.
International Search Report and Written Opinion for PCT/US2011/051996, mailed Jan. 19, 2012.
International Search Report and Written Opinion on PCT/US09/44200, mailed Jul. 1, 2009.
International Search Report and Written Opinion on PCT/US2012/038986, mailed Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.
Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 12/889,721, mailed Sep. 29, 2014.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,505, mailed May 8, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.

(56) References Cited

OTHER PUBLICATIONS

Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Final Office Action on U.S. Appl. No. 13/475,713, mailed Oct. 17, 2014.
Final Office Action on U.S. Appl. No. 13/475,722, mailed Oct. 20, 2014.
Notice of Allowance on U.S. Appl. No. 13/475,713, mailed Feb. 5, 2015.
Reexamination Report on Japanese Application 2012-536877, mailed Jan. 22, 2015 (English Translation not available).
Final Office Action on U.S. Appl. No. 13/692,741, mailed Mar. 11, 2015.
Non-Final Office Action on U.S. Appl. No. 14/106,698, mailed Feb. 12, 2015.
Notice of Allowance on U.S. Appl. No. 13/475,722, mailed Feb. 27, 2015.
Notice of Allowance on U.S. Appl. No. 13/527,498, mailed Feb. 23, 2015.
Notice of Allowance on U.S. Appl. No. 13/527,505, mailed Mar. 6, 2015.
Search Report on EP Application 10827330.1, mailed Feb. 12, 2015.
Final Office Action on U.S. Appl. No. 13/234,054, mailed Apr. 16, 2015.
Non-Final Office Action on U.S. Appl. No. 13/624,725, mailed Apr. 23, 2015.
Non-Final Office Action on U.S. Appl. No. 13/728,308, mailed May 14, 2015.
Non-Final Office Action on U.S. Appl. No. 14/052,723, mailed May 1, 2015.
Final Office Action on U.S. Appl. No. 12/889,721, mailed May 22, 2015.

* cited by examiner

SYSTEM AND METHOD FOR HIGH-PERFORMANCE, LOW-POWER DATA CENTER INTERCONNECT FABRIC WITH BROADCAST OR MULTICAST ADDRESSING

PRIORITY CLAIMS/RELATED APPLICATIONS

This patent application is a divisional of and claims priority under 35 USC 120 and 121 to U.S. patent application Ser. No. 12/794,996 filed on Jun. 7, 2010 which in turn claims the benefit under 35 USC 119(e) to U.S. Provisional Patent Application Ser. No. 61/256,723 filed on Oct. 30, 2009 and entitled "System and Method for Enhanced Communications in a Multi-Processor System of a Chip (SOC), which are both incorporated herein by reference.

FIELD

The disclosure relates generally to a switching fabric for a computer-based system.

BACKGROUND

With the continued growth of the internet, web-based companies and systems and the proliferation of computers, there are numerous data centers that house multiple server computers in a location that is temperature controlled and can be externally managed as is well known.

FIGS. 1A and 1B show a classic data center network aggregation as is currently well known. FIG. 1A shows a diagrammatical view of a typical network data center architecture 100 wherein top level switches 101a-n are at the tops of racks 102a-n filled with blade servers 107a-n interspersed with local routers 103a-f. Additional storage routers and core switches. 105a-b and additional rack units 108a-n contain additional servers 104e-k and routers 106a-g FIG. 1b shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers.

However, what is needed is a system and method for packet switching functionality focused on network aggregation that reduces size and power requirements of typical systems while reducing cost all at the same time and it is to this end that the disclosure is directed.

DETAILED DESCRIPTION OF ONE OR MORE EMBODIMENTS

The disclosure is particularly applicable to a network aggregation system and method as illustrated and described below and it is in this context that the disclosure will be described. It will be appreciated, however, that the system and method has greater utility since the system and method can be implemented using other elements and architectures that are within the scope of the disclosure and the disclosure is not limited to the illustrative embodiments described below.

The system and method also supports a routing using a tree-like or graph topology that supports multiple links per node, where each link is designated as an Up, Down, or Lateral link, or both, within the topology. In addition, each node in the system maybe be a combination computational/switch node, or just a switch node, and input/output (I/O) can reside on any node as described below in more detail. The system may also provide a system with a segmented Ethernet Media Access Control (MAC) architecture which may have a method of re-purposing MAC internet protocol (IP) addresses for inside MACs and outside MACs, and leveraging what would normally be the physical signaling for the MAC to feed into the switch. The system may also provide a method of non-spoofing communication, as well as a method of fault-resilient broadcasting, which may have a method of unicast misrouting for fault resilience. In the context of network security, a spoofing attack is a situation in which one person or program successfully masquerades as another by falsifying data and thereby gaining an illegitimate advantage.

The system may also provide a rigorous security between the management processors, such that management processors can "trust" one another. In the example system shown in FIG. 5A (which is described below in more detail), there is a management processor within each SoC (the M3 microcontroller, block 906, FIG. 5A). The software running on the management processor is trusted because a) the vendor (in this case Smooth-Stone) has developed and verified the code, b) non-vendor code is not allowed to run on the processor. Maintaining a Trust relationship between the management processors allow them to communicate commands (e.g. reboot another node) or request sensitive information from another node without worrying that a user could spoof the request and gain access to information or control of the system.

The system may also provide a network proxy that has an integrated microcontroller in an always-on power domain within a system on a chip (SOC) that can take over network proxying for the larger onboard processor, and which may apply to a subtree. The system also provide a multi-domaining technique that can dramatically expand the size of a routable fat tree like structure with only trivial changes to the routing header and the routing table.

Figure 1A:
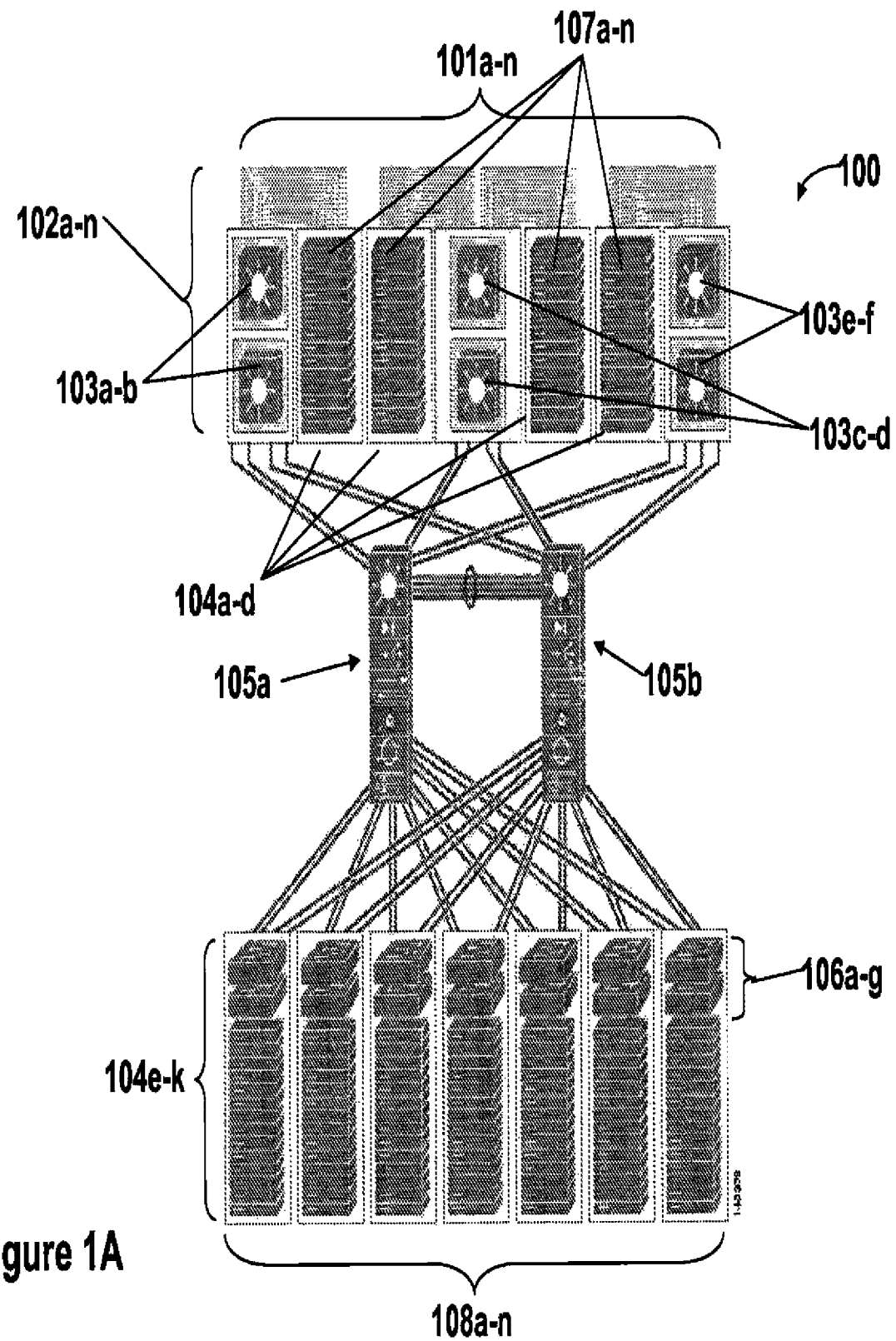
FIGS. 1A and 1B illustrate a typical data center system.
Figure 1B:
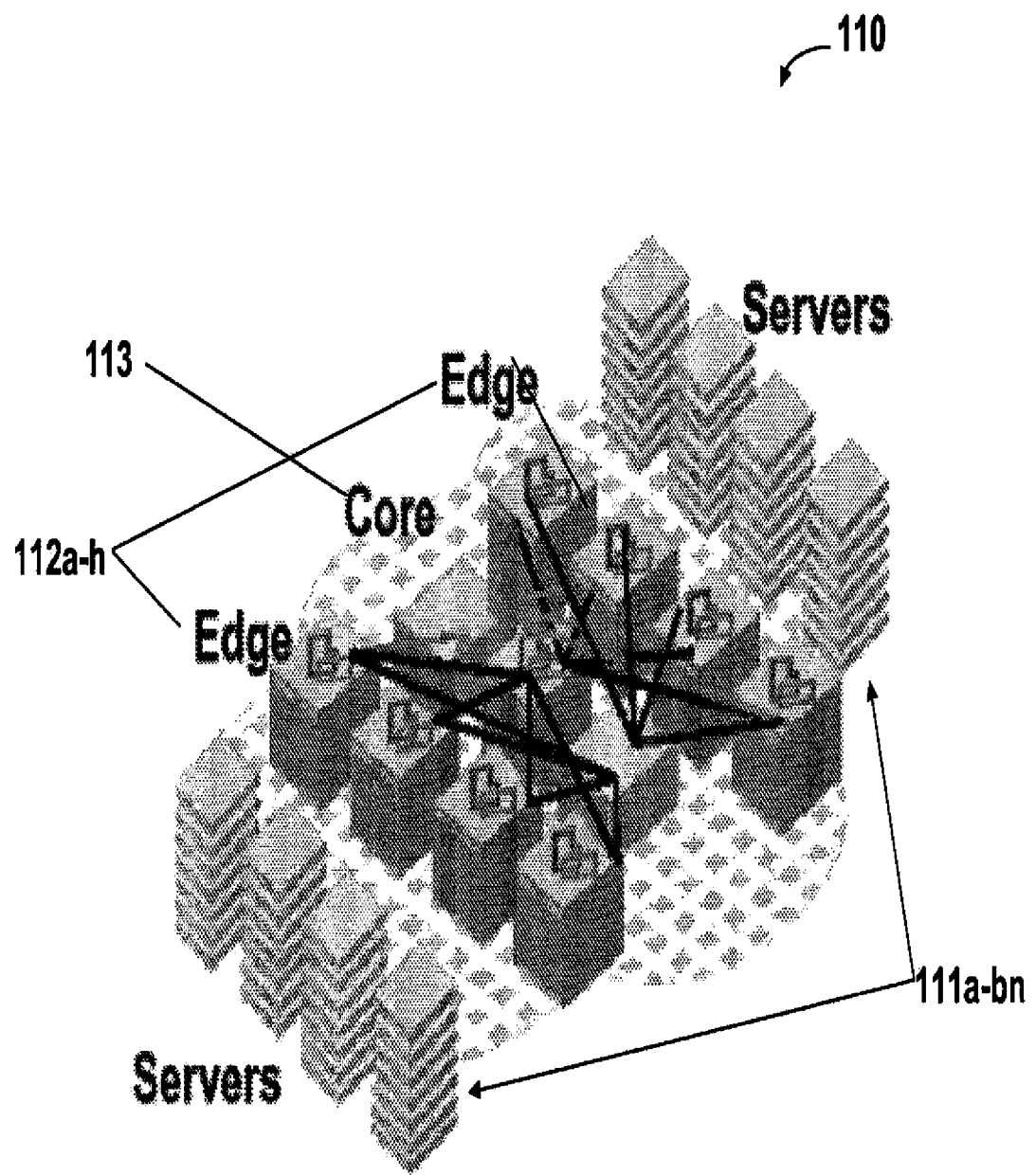
Figure 2:
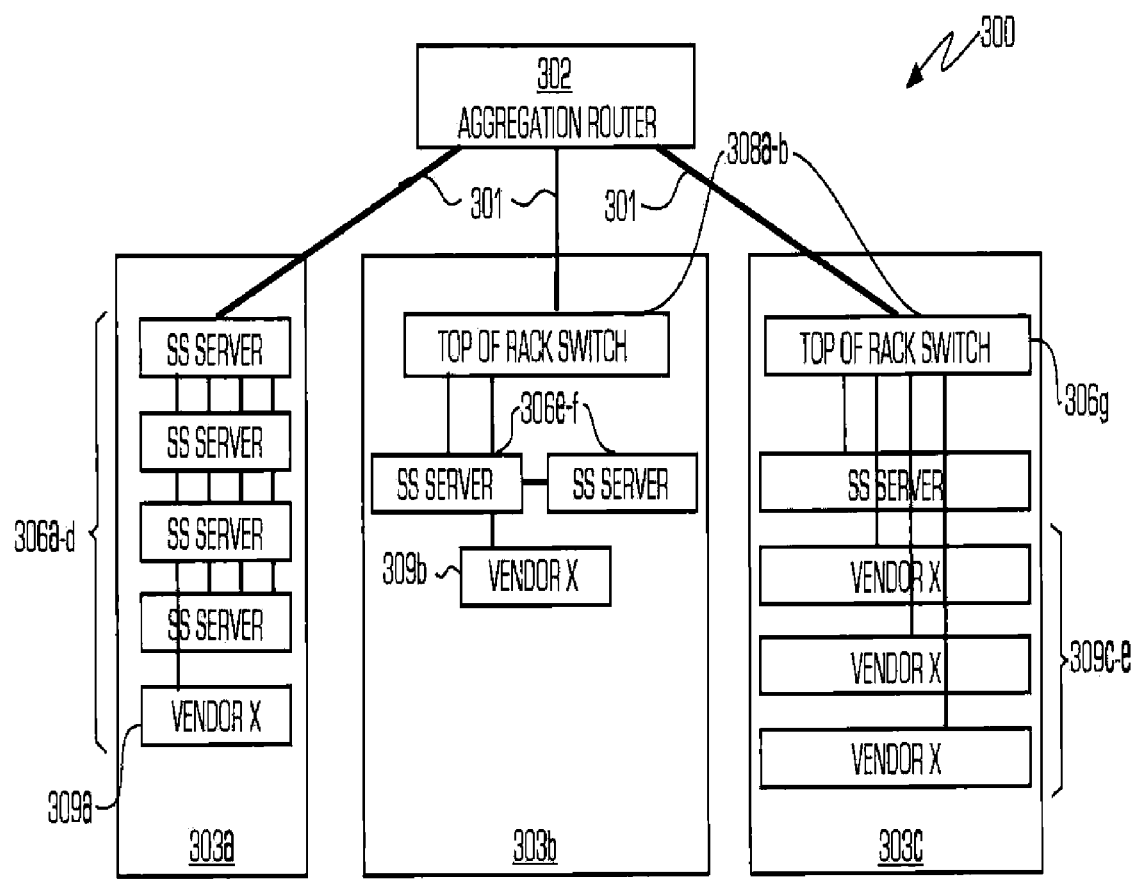
FIG. 2 is an overview of a network aggregation system.
Figure 3:
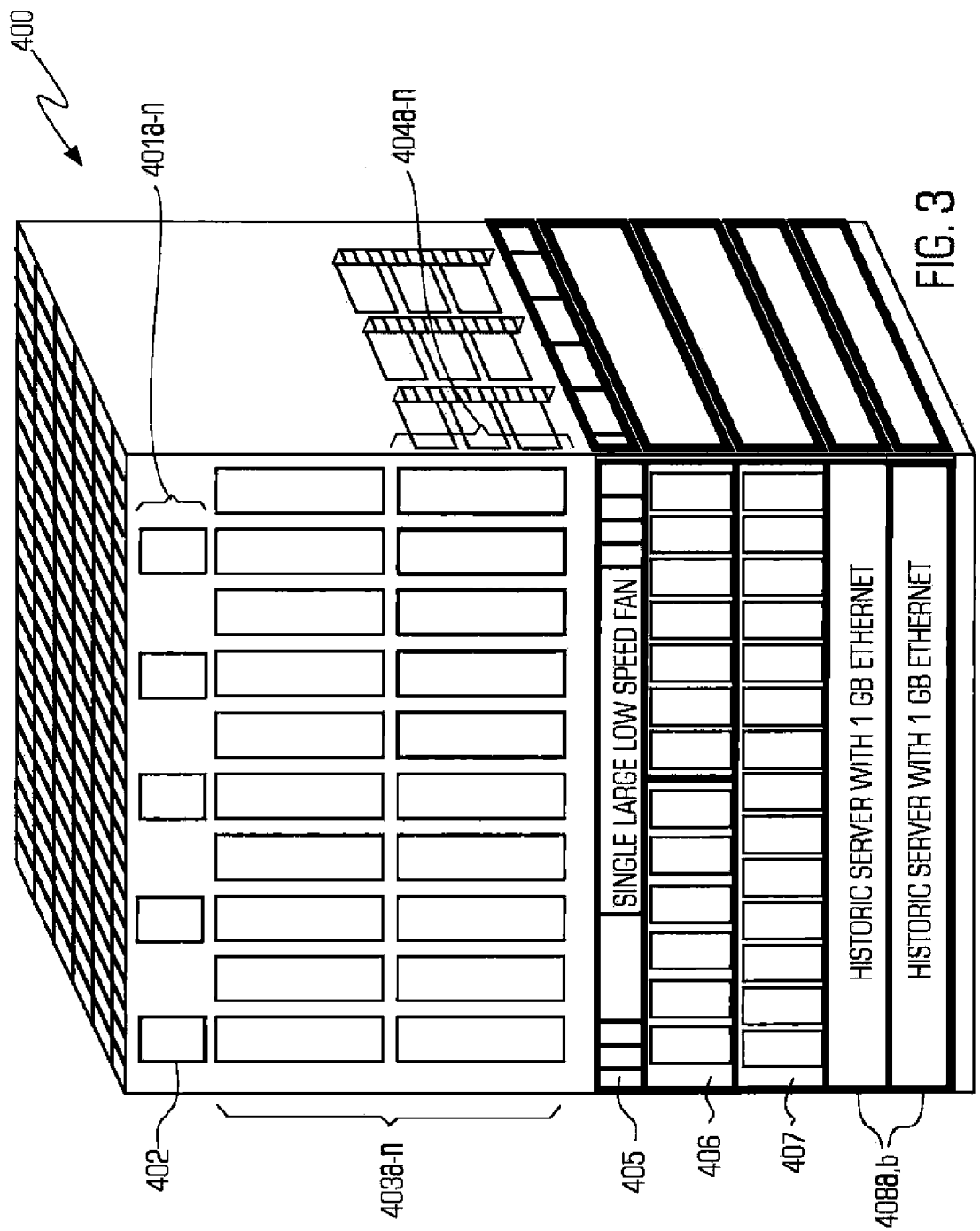
FIG. 3 illustrates an overview of an exemplary data center in a rack system.

FIG. 2 illustrates a network aggregation system 300. The network aggregation supports one or more high speed links 301 (thick lines), such as a 10-Gb/sec Ethernet communication, that connect an aggregation router 302 and one or more racks 303, such as three racks 303a-c as shown in FIG. 3. In a first rack 303a, the network aggregation system provides multiple high-speed 10 Gb paths, represented by thick lines, between one or more Smooth-Stone computing unit 306a-d, such as server computers, on shelves within a rack. Further details of each Smooth-Stone computing unit are described in more detail in U.S. Provisional Patent Application Ser. No. 61/256,723 filed on Oct. 30, 2009 and entitled "System and Method for Enhanced Communications in a Multi-Processor System of a Chip (SOC)" which is incorporated herein in its entirety by reference. An embedded switch 306a-d in the Smooth-Stone computing units can replace a top-of-rack switch, thus saving a dramatic amount of power and cost, while still providing a 10 Gb Ethernet port to the aggregation router 302. The network aggregation system switching fabric can integrate traditional Ethernet (1 Gb or 10 Gb) into the XAUI fabric, and the Smooth-Stone computing units can act as a top of rack switch for third-party Ethernet connected servers.

A middle rack 303b illustrates another configuration of a rack in the network aggregation system in which one or more Smooth-Stone computing units 306e, f can integrate into existing data center racks that already contain a top-of-rack switch 308a. In this case, the IT group can continue to have their other computing units connected via 1 Gb Ethernet up to the existing top-of-rack switch and the internal Smooth-Stone computing units can be connected via 10 Gb XAUI fabric and they can integrate up to the existing top-of-rack switch with either a 1 Gb or 10 Gb Ethernet interconnects as shown in FIG. 2. A third rack 303c illustrates a current way that data center racks are traditionally deployed. The thin red lines in the third rack 303c represent 1 Gb Ethernet. Thus, the current deployments of data center racks is traditionally 1 Gb Ethernet up to the top-of-rack switch 308b, and then 10 Gb (thick fed line 301) out from the top of rack switch to the aggregation router. Note that all servers are present in an unknown quantity, while they are pictured here in finite quantities for purposes of clarity and simplicity. Also, using the enhanced SS servers, no additional routers are needed, as they operate their own XAUI switching fabric, discussed below.

FIG. 3 shows an overview of an exemplary "data center in a rack" 400 according to one embodiment of the system. The "data center in a rack" 400 may have 10-Gb Ethernet PHY 401a-n and 1-Gb private Ethernet PHY 402. Large computers (power servers) 403a-n support search; data mining; indexing; Apache Hadoop, a Java software framework; MapReduce, a software framework introduced by Google to support distributed computing on large data sets on clusters of computers; cloud applications; etc. Computers (servers) 404a-n with local flash and/or solid-state disk (SSD) support search, MySQL, CDN, software-as-a-service (SaaS), cloud applications, etc. A single, large, slow-speed fan 405 augments the convection cooling of the vertically mounted servers above it. Data center 400 has an array 406 of hard disks, e.g., in a Just a Bunch of Disks (JBOD) configuration, and, optionally, Smooth-Stone computing units in a disk form factor (for example, the green boxes in arrays 406 and 407), optionally acting as disk controllers. Hard disk servers or SS disk servers may be used for web servers, user applications, and cloud applications, etc. Also shown are an array 407 of storage servers and historic servers 408a, b (any size, any vendor) with standard Ethernet interfaces for legacy applications.

The data center in a rack 400 uses a proprietary system interconnect approach that dramatically reduces power and wires and enables heterogeneous systems, integrating existing Ethernet-based servers and enabling legacy applications. In one aspect, a complete server or storage server is put in a disk or SSD form factor, with 8-16 SATA interfaces with 4 ServerNodes™ and 8 PCIe x4 interfaces with 4 ServerNodes™. It supports disk and/or SSD+ServerNode™, using a proprietary board paired with a disk(s) and supporting Web server, user applications, cloud applications, disk caching, etc.

The Smooth-Stone XAUI system interconnect reduces power, wires and the size of the rack. There is no need for high powered, expensive Ethernet switches and high-power Ethernet Phys on the individual servers. It dramatically reduces cables (cable complexity, costs, significant source of failures). It also enables a heterogeneous server mixture inside the rack, supporting any equipment that uses Ethernet or SATA or PCIe. It can be integrated into the system interconnect.

The herein presented aspects of a server-on-a-chip (SOC) with packet switch functionality are focused on network aggregation. The SOC is not a fully functionally equivalent to an industry-standard network switch, such as, for example, a Cisco switch or router. But for certain applications discussed throughout this document, it offers a better price/performance ratio as well as a power/performance ratio. It contains a layer 2 packet switch, with routing based on source/destination MAC addresses. It further supports virtual local area network (VLAN), with configurable VLAN filtering on domain incoming packets to minimize unnecessary traffic in a domain. The embedded MACs within the SOC do have complete VLAN support providing VLAN capability to the overall SOC without the embedded switch explicitly having VLAN support. It can also wake up the system by management processor notifying the management processor on link state transitions to reprogram routing configurations to route around faults. Such functionality does not require layer3 (or above) processing (i.e., it is not a router). It also does not offer complete VLAN support, support for QoS/CoS, address learning, filtering, spanning tree protocol (STP), etc.

Figure 4:
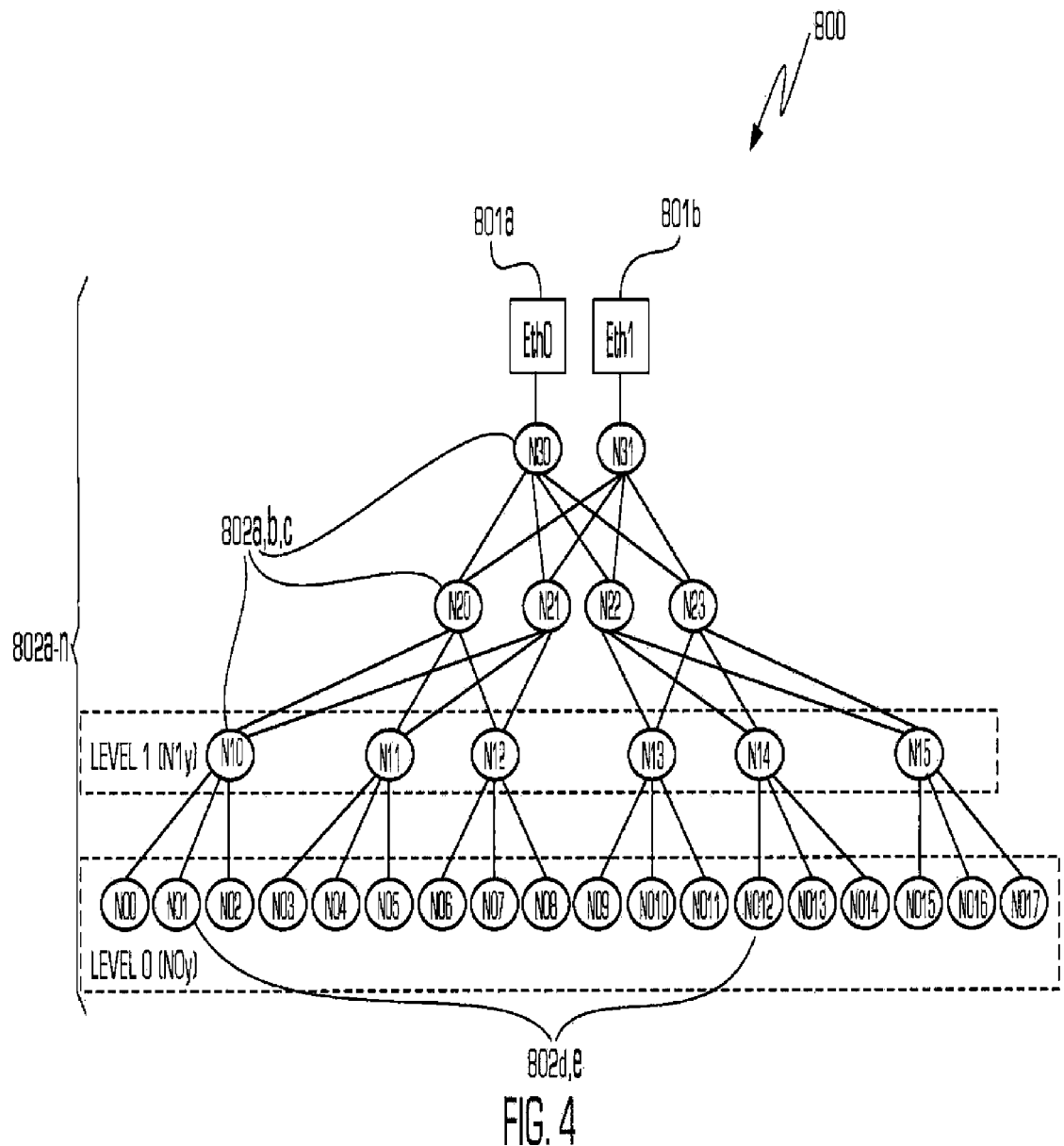
FIG. 4 illustrates a high-level topology of a network aggregating system.

FIG. 4 shows a high-level topology 800 of the network system that illustrates XAUI connected SoC nodes connected by the switching fabric. The 10 Gb Ethernet ports Eth0 801a and Eth1 801b come from the top of the tree. Ovals 802a-n are Smooth-Stone nodes that comprise both computational processors as well as the embedded switch. The nodes have five XAUI links connected to the internal switch. The switching layers use all five XAUI links for switching. Level 0 leaf nodes 802d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 800 has the flexibility to permit every node to be a combination computational and switch node, or just a switch node. Most tree-type implementations have I/O on the leaf nodes, but topology 800 let the I/O be on any node. In general, placing the Ethernet at the top of the tree minimizes the average number of hops to the Ethernet.

Figure 5A:
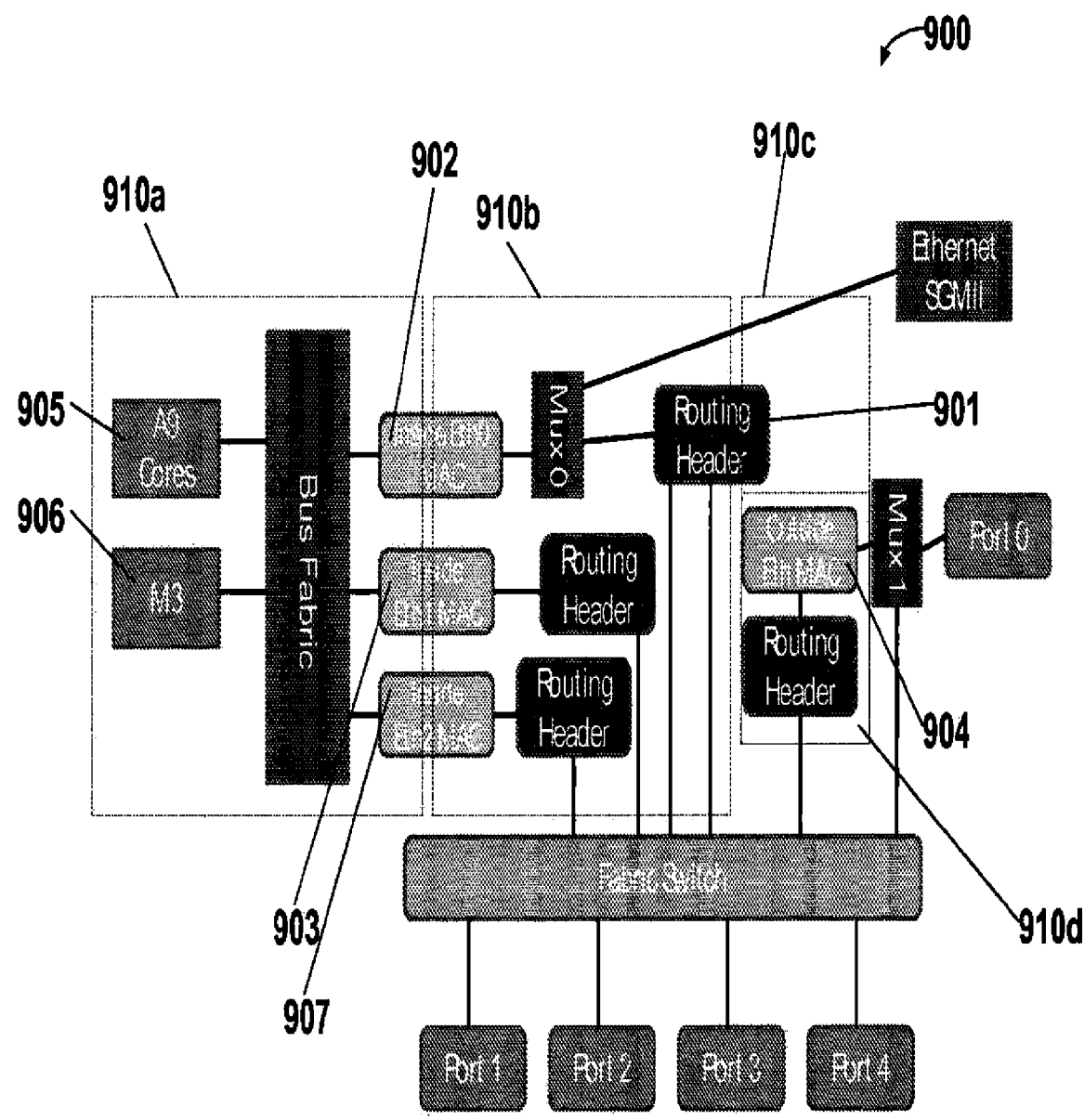
FIG. 5A illustrates a block diagram of an exemplary switch of the network aggregation system.
Figure 6:
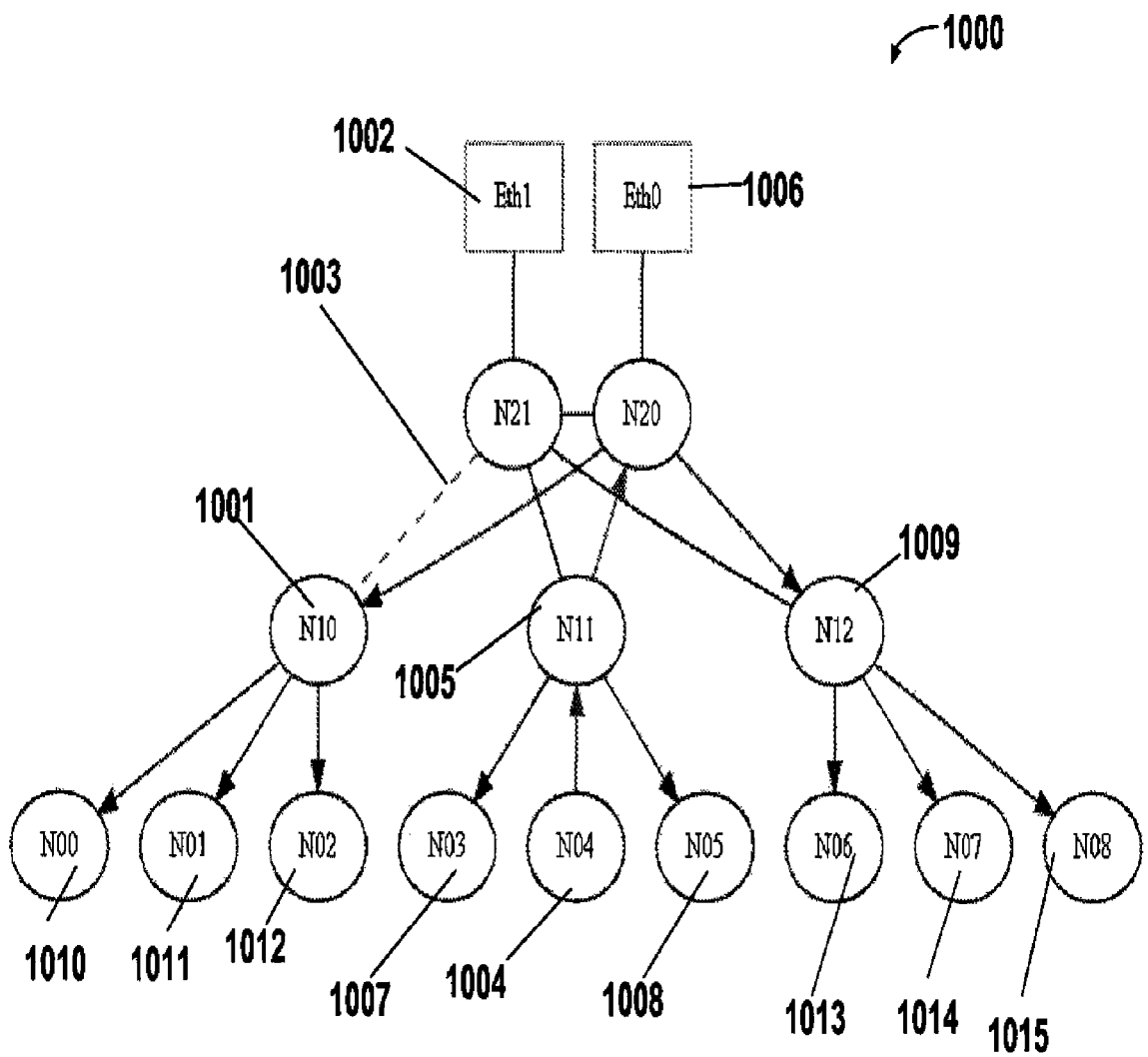
FIG. 6 illustrates a first embodiment of a broadcast mechanism of the network aggregation system.

In more detail, the ovals shown in the tree-oriented topology in FIG. 6 represent independent nodes within a computing cluster. FIG. 5A illustrates one example implementation of an individual node of the cluster. When looking at a conventional implementation of a topology e.g. in FIG. 6, usually computing nodes are found in the lower level leaf nodes (e.g. N00-N08), and the upper level nodes don't have computing elements but are just network switching elements (N10-N21). With the node architecture shown in FIG. 5A, the A9 Cores (905) may be optionally enabled, or could be just left powered-off. So the upper level switching nodes (N10-N21) in FIG. 6 can be used as pure switching elements (like traditional implementations), or we can power on the A9 Cores module and use them as complete nodes within the computing cluster.

The switch architecture calls for a routing frame to be prepended to the Ethernet frame. The switch operates only against fields within the routing frame, and does not inspect the Ethernet frame directly. FIG. 5a shows a block diagram of an exemplary switch 900 according to one aspect of the system and method disclosed herein. It has four areas of interest 910*a-d*. Area 910*a* corresponds to Ethernet packets between the CPUs and the inside MACs. Area 910*b* corresponds to Ethernet frames at the Ethernet physical interface at the inside MACs, that contains the preamble, start of frame, and inter-frame gap fields. Area 910*c* corresponds to Ethernet frames at the Ethernet physical interface at the outside MAC, that contains the preamble, start of frame, and inter-frame gap fields. Area 910*d* corresponds to Ethernet packets between the processor of routing header 901 and outside MAC 904. This segmented MAC architecture is asymmetric. The inside MACs have the Ethernet physical signaling interface into the routing header processor, and the outside MAC has an Ethernet packet interface into the routing header processor. Thus the MAC IP is re-purposed for inside MACs and outside MACs. In addition, the normal physical signaling for the MAC that feeds into the switch is leveraged. MAC configuration is such that the operating system device drivers of A9 cores 905 manage and control inside Eth0 MAC 902 and inside ETH1MAC 903. The device driver of management processor 906 manages and controls Inside Eth2 MAC 907. Outside Eth MAC 904 is not controlled by a device driver. MAC 904 is configured in Promiscuous mode to pass all frames without any filtering for network monitoring. Initialization of this MAC is coordinated between the hardware instantiation of the MAC and any other necessary management processor initialization. Outside Eth MAC 904 registers are visible to both A9 905 and management processor 906 address maps. Interrupts for Outside Eth MAC 904 are routable to either the A9 or management processor. The XGMAC supports several interruptible events that the CPUs may want to monitor, including any change in XGMII link fault status, hot-plugging or removal of PHY, alive status or link status change, and any RMON counter reaching a value equal to the threshold register. The exemplary switch also has a known Serial Gigabit Media Independent Interface (SMGII) Ethernet interface connected to a multiplexer (MUXO) that multiplexes data from the SGMII Ethernet interface and the routing header 901.

In some cases, there may be Preamble, Start of Frame, and Inter-Frame gap fields across XAUI, depending on the specific micro-architecture. The routing frame header processor may standardize these fields. The XAUI interface may need some or all of these fields. In this case, the routing header processor at area 910*d* needs to add these going into the switch, and to remove them leaving the switch. To reduce the number of bytes that need to be sent over XAUI, these three fields may be removed (if the XAUI interface allows it). In this case, the routing header processor at area 910*b* will need to strip these going into the switch, and add them back leaving the switch.

The routing frame header processor receives an Ethernet frame from a MAC, sending a routing frame to the switch. It also standardizes the preamble, start of frame, and inter-frame gap fields, prepends a routing header, and receives a routing frame from the switch, sending the Ethernet frame into a MAC. This processor then strips the routing header and standardizes the preamble, start of frame, and inter-frame gap fields. Note that all frames that are flowing within the fabric are routing frames, not Ethernet frames. The Ethernet frame/routing frame conversion is done only as the packet is entering or leaving the fabric via a MAC. Note also that the routing logic within the switch may change fields within the routing frame. The Ethernet frame is never modified (except the adding/removing of the preamble, start of frame, and inter-frame gap fields).

The routing frame is composed of the routing frame header plus the core part of the Ethernet frame, and is structured as shown in Table 1, below:

TABLE 1

| Routing Frame Header | Ethernet Frame Packet | | | | |
|---|---|---|---|---|---|
| RF Header | MAC destination | MAC Source | Ethertype/ Length | Payload (data and padding) | CRC3 2 |

Note that the implementation assumptions for bit sizing are 4096 nodes→12 bit node IDs. These fields may be resized during implementation as needed.

The routing frame header consists of the fields shown in Table 2, below:

TABLE 2

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_ management processor, 3 = MAC_OUT |
| Dest Node | 12 | Destination node ID |
| Dest Port | 2 | 0 = MAC0, 1 = MAC1, 2 = MAC_ management processor, 3 = MAC_OUT |
| RF Type | 2 | Routing Frame Type (0 = Unicast, 1 = Multicast, 2 = Neighbor Multicast, 3 = Link Directed) |
| TTL | 6 | Time to Live-# of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |
| Total | 46 | +checksum |

If a switch receives a packet that fails the checksum, the packet is dropped, a statistic counter is incremented, and the management processor is notified.

Figure 5B:
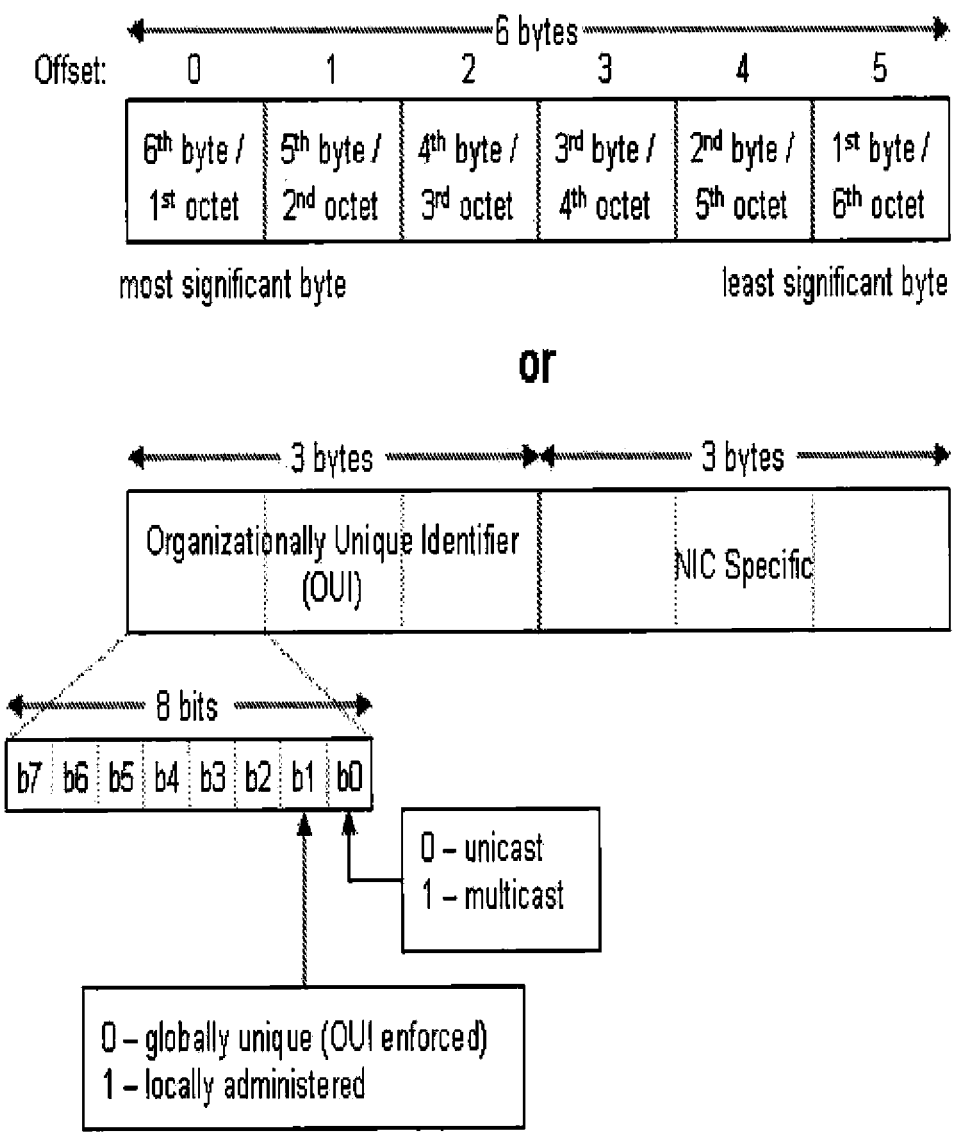
FIG. 5B illustrates the MAC address encoding.

The routing frame processor differentiates between several destination MAC address encodings. As a reminder, MAC addresses are formatted as shown in FIG. 5*b*. The following table describes the usage of the 3 byte OUI and 3 byte NIC specific field within the MAC address. One of the novel aspects of the system and method disclosed herein is the use of additional address bits to encode an internal to external MAC mapping, as shown also in the Table 3, below, in the second entry under "Fabric Internal Node local address Hits MAC Lookup CAM".

TABLE 3

| MAC Address Type | 3 bytes OUI | 3 bytes NIC Specific | Operation |
| --- | --- | --- | --- |
| External Misses MAC Lookup CAM | Multicast bit not set | Arbitrary | Packet unicast routed to gateway node #. |
| Fabric Internal Node local address Hits MAC Lookup CAM | Arbitrary | Node local address (meaning low 2 bits-port unit ID) are not present. MAC Lookup CAM for entry marked as Node Local. | Packet unicast routed to fabric node # obtained from MAC Lookup CAM |
| Fabric Internal Arbitrary MAC address Hits MAC Lookup CAM | Arbitrary | Arbitrary | Packet unicast routed to fabric node # obtained from MAC Lookup CAM |
| Node Encoded Unicast | Unicast Locally administered OUI == Switch OUI | 10 bits: SS_MAC_NODE_ ENCODED_MAGIC 12 bits: Node ID 2 bits: Port ID | Packet unicast routed to Node ID. |
| Link Encoded Unicast | Unicast Locally administered OUI == Switch OUI | 12 bits: SS_MAC_LINK_ ENCODED_MAGIC 7 bits: Reserved 3 bits: Link # (0-4) 2 bits: Port | Packet sent down specific Link #. |
| Multicast/ Broadcast | Multicast bit set | Arbitrary | Packet broadcast routed through fabric and gateways. |
| Neighbor Multicast | Multicast bit set Locally administered OUI = Switch OUI | 12 bits: SS_NEIGHBOR_ MCAST_MAGIC 12 bits: Reserved | Packet sent through all XAUI links to neighboring nodes and not rebroadcast to other nodes |

Further, other novel aspects can be found in Table 3 under "Node Encoded Unicast" as well as "Link Encoded Unicast," allowing one internal node or link to address all external MAC sections, and the "Neighbor Multicast" entry, allowing a multicast to neighboring nodes.

Note that the values SS_MAC_NODE_ENCODED_MAGIC and SS_MAC_LINK_ENCODED_MAGIC are constant identifiers used for uniquely identifying these MAC address types. The term "magic number" is a standard industry term for a constant numerical or text value used to identify a file format or protocol. These magic numbers are configured in two registers (magicNodeEncodedMAC and magicLinkEncodedMAC that default to standard values during hardware initialization, but allow the management processor software to change them if necessary.

The header processor contains a MAC Lookup CAM (Content Addressable Memory), macAddrLookup, that maps from 6 byte MAC addresses to 12-bit Node IDs, as shown in Table 4, below.

TABLE 4

| MAC Lookup CAM Input | | MAC Lookup CAM Output | |
| --- | --- | --- | --- |
| Node Local 1 bit | MAC Address 6 bytes | Node ID 12 bits | Port ID 2 bits |

The number of rows in this CAM is implementation dependent, but would be expected to be on the order of 256-1024 rows. The management processor initializes the CAM with Node ID mappings for all the nodes within the SS fabric. There are two types of rows, depending upon the setting of the Node Local bit for the row. The Node Local field allows a 4:1 compression of MAC addresses in the CAM for default MAC addresses, mapping all four MACs into a single row in the CAM table, which is Table 5, below.

TABLE 5

| MAC Address Type | Node Local | MAC Address | Port ID |
| --- | --- | --- | --- |
| Node Local | 1 | A Node Encoded Address refers to a Smooth Stone assigned MAC address for a node. It encodes the port # (MAC0, MAC1, management processor, Rsvd) into a 2-bit Port ID in the lowest two bits of the NIC address field. Ignores low 2 bits during match. | Taken from low 2 bits of MAC Address Input |
| Arbitrary | 0 | Matches against all 6 bytes | Taken from CAM Output field |

The arbitrary rows in the CAM allow mapping of the MAC address aliases to the nodes. Linux (and the MACs) allow the MAC addresses to be reassigned on a network interface (e.g., with ifconfig eth0 hw ether 00:80:48:BA:d1:30). This is sometime used by virtualization/cloud computing to avoid needing to re-ARP after starting a session.

The switch architecture provides for a secondary MAC Lookup CAM that only stores the 3 bytes of the NIC Specific part of the MAC address for those addresses that match the Switch OUI. The availability of this local OUI CAM is determined by the implementation. See Table 6, below.

TABLE 6

| MAC Lookup CAM Input | MAC Lookup CAM Output | |
|---|---|---|
| MAC Address NIC Specific 3 bytes | Node ID 12 bits | Port ID 2 bits |

The maximum number of nodes limitation for three types of MAC address encodings may be evaluated as follows:

1. Default MAC Addressees—management processor sets Node Local mappings for each of the nodes in the fabric. There is one entry in the CAM for each node. Max # of nodes is controlled by maximum # of rows in the MAC Address Lookup CAM.

2. Node Encoded Addresses—All the MACs are reprogrammed to use Node Encoded Addresses. In this way the Node IDs are directly encoded into the MAC addresses. No entries in the MAC Lookup CAM are used. Max # of nodes is controlled by maximum # of rows in the Unicast lookup table (easier to make big compared to the Lookup CAM). Note that this also gives us some risk mitigation in case the MAC Lookup CAM logic is busted. Provides use case for the node encoded addresses idea.

3. Arbitrary MAC Address Aliases—Takes a row in the CAM. As an example, a 512-row CAM could hold 256 nodes (Node local addresses)+1 MAC address alias per node.

Since the Lookup CAM is only accessed during Routing Header creation, the management processor actually only needs to populate a row if the MAC address within the fabric is being used as a source or destination MAC address within a packet. In other words, if two nodes never will talk to each other, a mapping row does not need to be created. But usually the management processor won't have that knowledge, so it's expected that mappings for all nodes are created in all nodes. Also note that even if an entry is not created in the Lookup CAM, the routing will actually still succeed by routing the packet out the Ethernet gateway, through an external router, back into the Fabric, to the destination node.

Table 7 defines how to set fields within the Routing Header for all the fields except for destination node and port.

TABLE 7

| Field | Set To |
|---|---|
| Domain ID | Set to the macDomainID field for the MAC that the packet came from. |
| Mgmt Domain | Set to the macMgmtDomain field for the MAC that the packet came from. |
| Source Node | Switch Node ID |
| Source Port | Source MAC Port ID |
| RF Type | Multicast (if dstMAC multicast and not Neighbor Multicast format) |
| | Neighbor Multicast (if dstMAC multicast and is Neighbor Multicast format) |
| | Link Directed (is Link Encoded format) |
| | Unicast (if not one of the above) |
| TTL | 0 |
| Broadcast ID | If dstMAC is unicast-Set to 0 |
| | If dstMAC is multicast-Set to incremented local broadcast ID (bcastIDNext++ & 0xf) |

Table 8 defines how to set destination node and port for addresses within the fabric:

TABLE 8

| Case | Field: Destination Node | Field: Destination Port |
|---|---|---|
| Node Encoded Dest Address | Dest Node | Dest Port |
| Link Encoded Dest Address | Encoded Link | Dest Port |
| Hits Lookup CAM (node local) | CAM Dest Node | Dest MAC (low 2 bits) |
| Hits Lookup CAM (not node local) | CAM Dest Node | CAM Dest Port |

Table 9 defines how to set destination node and port for addresses outside the fabric:

TABLE 9

| Case | Field: Destination Node | Field: Destination Port |
|---|---|---|
| Came in an OUT Ethernet, but no secondary gateway defined | Drop packet, update statistics counter | |
| Came in an OUT Ethernet, and secondary gateway defined | secondaryEthGatewayNode[OUT] | OUT |
| From an Inside MAC, but no primary gateway defined | Drop packet, update statistics counter, and notify management processor | |
| From an Inside MAC, and primary gateway defined | primaryEthGatewayNode[fromPort] | OUT |

Additionally, the management processor software architecture of the system and method disclosed here currently depends on the ability of management processor nodes to "trust" each other. This more rigorous security on management processor to management processor communication is desirable, as well a better security on private management LANs across the fabric. This fabric issue may be mitigated by simply defining, for environments that require multiple "hard" security domains, that customers simply don't mix security domains within a fabric. In such cases, it may be possible to connect 14-node boards to the top of rack switch, allowing customers to have VLAN granularity control of each 14-node board.

The multi-domain fabric architecture that has been described addresses the lack of VLAN support by creating secure "tunnels" and domains across the fabric, and it can interoperate with VLAN protected router ports on a 1:1 basis.

The approach to domain management in the system and method disclosed here is as follows: Support multiple domain IDs within the fabric. Allow each of the MACs within a node (management processor, MAC0, MAC1, Gateway) to be assigned to a domain ID individually (and tagged with domain 0 if not set). Allow each of the MACs within a node to have a bit indicating access to the management domain. The domain IDs associated with a MAC could only be assigned by the management processor, and could not be altered by the A9. For frames generated by MACs (both inside and outside), the routing frame processor would tag the routing frame with the domain ID and management domain state associated with that MAC. Domains would provide the effect of tunnels or VLANs, in that they keep packets (both unicast and multicast) within that domain, allowing MACs outside that domain to be able to neither sniff or spoof those packets. Additionally, this approach would employ a five-bit domain ID. It would add options to control domain processing, such as, for example, a switch with a boolean per MAC that defines whether packets are delivered with non-defined (i.e., zero) domain ID, or a switch that has a boolean per MAC that defines whether packets are delivered with defined (non-zero) but non-matching domain IDs. A further option in the switch could turn off node encoded MAC addresses per MAC (eliminating another style of potential attack vector).

To keep management processor to management processor communication secure, the management domain bit on all management processor MACs could be marked. Generally, the management processor should route on domain 1 (by convention). Such a technique allows all the management processor's to tunnel packets on the management domain so that they cannot be inspected or spoofed by any other devices (inside or outside the fabric), on other VLANs or domains. Further, to provide a secure management LAN, a gateway MAC that has the management domain bit set could be assigned, keeping management packets private to the management processor domain. Additionally, the switch fabric could support "multi-tenant" within itself, by associating each gateway MAC with a separate domain. For example, each gateway MAC could connect to an individual port on an outside router, allowing that port to be optionally associated with a VLAN. As the packets come into the gateway, they are tagged with the domain ID, keeping that traffic private to the MACs associated with that domain across the fabric.

The switch supports a number of registers (aka CSRs, aka MMRs) to allow software or firmware to control the switch. The actual layout of these registers will be defined by the implementation. The fields listed in Table 10 are software read/write. All these registers need to have a mechanism to secure them from writing from the A9 (could be secure mode or on a management processor private bus).

TABLE 10

| Field | Size | Notes |
| --- | --- | --- |
| Adaptive | 1 bit | Adaptive unicast routing enabled. |
| broadcastLateral | 1 bit | Enable to have broadcasts go through lateral links, rather than just Up and Down links. Turning this off will work for most topologies and will reduce # duplicate broadcast packets. |
| intPortBroadcastVec | 4 bits | Vector of ports to send internally generated broadcast packet into. |
| extPortBroadcastVec | 4 bits | Vector of ports to send externally generated broadcast packet into. |
| linkDir[LINKS] | Array [LINKS] x 2 bits | Specifies link direction for each link (0 = DOWN, 1 = LATERAL, 2 = UP, 3 = Rsvd) |
| linkState | 5 bits | Link state vector for each of the 5 links. Bit set indicates that link is active (trained and linked). |
| linkType[LINKS] | Array [LINKS] x 2 bits | Specifies type of each link (0 = No Link, 1 = XAUI, 2 = Ethernet} |
| localBroadcastM3Snoop | 1 bit | When set, then we'll always send a copy of the locally initiated broadcast into the management processor. The use case here is where the management processor wants to see the gratuitous ARPs that are locally initiated so that it can communicate across the management processor fabric and add corresponding entries into the local unicast routing tables. |
| macAddrLookup | Lookup CAM which is described elsewhere in the document | MAC address lookup CAM to convert MAC addresses to Node IDs. |
| macAcceptOtherDomain[MAC] | 1 bit[MAC] | Defines that the MAC accepts packets that are tagged with a non-zero, non-matching domain ID. |
| macAcceptZeroDomain[MAC] | 1 bit[MAC] | Defines that the MAC accepts packets that are not tagged with a domain (i.e. 0 domain) |
| macDomainID[MAC] | 5 bits[MAC] | Defines the Domain ID for each of the 4 MACs. A value of 0 indicates that the domain ID for that MAC is not set. |

TABLE 10-continued

| Field | Size | Notes |
|---|---|---|
| macMgmtDomain[MAC] | 1 bit[MAC] | Defines that the MAC may access the management domain. Setting this tags the management domain in the routing frame, as well as allows the switch to route management frame packets into this MAC. |
| magicNodeEncodedMAC | 10 bits | Magic number for Node Encoded MAC addresses |
| magicLinkEncodedMAC | 12 bits | Magic number for Link Encoded MAC addresses |
| maxTTL | 6 bits | Maximum TTL count allowed in a routing header. Exceeding this number of hops causes the switch to drop the packet, update a statistic counter, and inform the management processor. |
| myNodeID | 12 bits | Need not be contiguous. Subtree's should ideally be numbered within a range to facilitate subtree network proxying. |
| myOUI | 3 bytes | 3 upper bytes of MAC addresses in fabric. Should be the same for all nodes in the fabric. |
| nodeRangeEnable | 1 bit | Enables the expanded Node ID matching of [nodeRangeLo, nodeRangeHi]. Used for Network Proxying through a subtree. When enabled, a packet will be routed into the node (rather than through the node) if either DstNode == myNodeID OR (nodeRangeLo <= DstNode <= nodeRangeHi). |
| nodeRangeHi | 12 bits | Enabled with nodeRangeEnable. Specifies high node ID of node range match. |
| nodeRangeLo | 12 bits | Enabled with nodeRangeEnable. Specifies low node ID of node range match. |
| noFlowControl | 1 bit | When enabled, there will be no flow control. |
| portRemap[INT_PORTS]; | Array [INT_PORTS] x 2 bits | Allows remapping of incoming destination port IDs to the internal port where it'll be delivered. This register defaults to an equivalence remapping. An example of where this will get remapped is during Network Proxy where the management processor will remap MAC0 packets to be sent to the management processor.<br>INT_PORTS = 4. Array elements are the Ports enumeration (management processor, MAC0, MAC1, OUT).<br>2 bits contents is the Ports enumeration. |
| primaryEthGatewayNode [INT_PORTS] | Array [INT_PORTS] of 12-bit | Specifies Node ID of primary Ethernet gateway for this node. Packets destined to node IDs that aren't within the fabric will get routed here. |
| promiscuousPortVec | 4 bits | Can be configured for Promiscuous Mode allowing traffic on one or more links to be snooped by the management processor or A9s in order to collect trace data or to implement an Intruder Detection System (IDS). This causes all traffic passing through the switch to be copied to the internal ports defined by this port vector. |
| routeForeignMACsOut | 1 bit | When enabled, a MAC address that does not contain a myOUI address, will not check the MAC lookup CAM, and will get treated as a MAC lookup CAM miss, thus getting routed to the gateway port. This saves latency in the common case of not populating the CAM with foreign MAC aliases. |
| secondaryEthGatewayNode [INT_PORTS] | Array [INT_PORTS] of 12-bit | Specifies Node ID of secondary Ethernet gateway. Incoming (from OUT) packets routing through the fabric will be sent here. |
| unicastPortsFromOtherExt Gateways | 1 bit | An incoming unicast from an external gateway will get the gateway node put into the source node field of the routing header. Upon reaching the destination node, this bit will be checked. When the bit is clear, the external gateway node must match the destination gateway node for it to be delivered to internal ports. This is to handle the case where the fabric is connected to an external learning switch that hasn't yet learned the mac/port relationship, and floods the unicast packet down multiple ports. This will prevent |

TABLE 10-continued

| Field | Size | Notes |
|---|---|---|
| unicastRoute[NODES] | Array [NODES] of 10 bits | a fabric node from getting the unicast packet multiple times. Link vector of unicast next route. 10 bits is 2-bit weight for each of 5 links. |

The registers shown in Table 11 are contained within the Switch implementation, but need not be software accessible.

TABLE 11

| Field | Size | Notes |
|---|---|---|
| bcastIDNext | 5 bits | Next broadcast sequence ID to issue next. Hardware will increment this for each broadcast packet initiated by this node. |
| bcastIDSeen[BCAST_ID_LEN] | Array [BCAST_ID_LEN] of 5 bits. | FIFO list of broadcast tags seen by this node. |
| bcastIDSeenNext | # bits to index into BCAST_ID_LEN | Next array position into bcastIDSeen[ ] to insert a broadcast tag. |

Note that software should be able to update the routing tables (unicastRoute) and the macAddrLookup CAM atomically with respect to active packet routing. One implementation will be to hold off routing access to these tables during an update operation.

Broadcast/Multicast Routing

Figure 7:
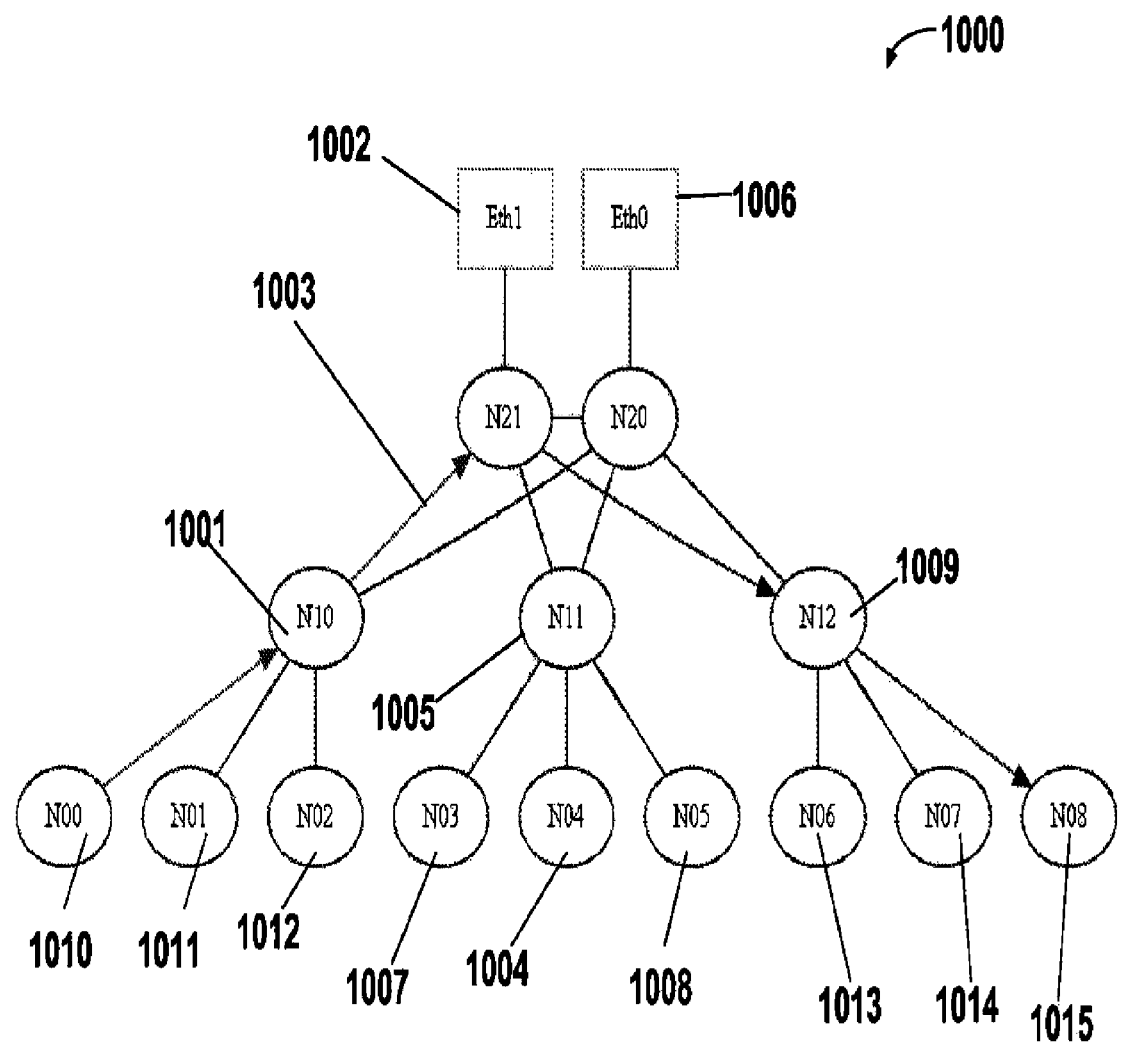
FIG. 7 illustrates an example of unicast routing of the network aggregation system.

FIG. 6 shows an exemplary broadcast mechanism 1000 according to one aspect of the system and method disclosed herein. The link between nodes N10 1001 and N21 1002 is down, as indicated by the dashed line 1003. During routing header generation of multicast packets, the source node puts an incremented broadcast ID for that source node in the routing frame (rframe.bcastID). When a node receives a multicast routing frame (i.e. rframe.rfType==Multicast|| rframe.rfType==NeighborMulticast), it checks to see whether it has already seen this broadcast packet. The check is done by accessing the bcastIDSeen CAM with a tag formed with the broadcast source node and the broadcast ID. If it has already been seen (i.e. CAM hit), no action is be performed. If the broadcast frame has not been seen before, it broadcasts it to appropriate internal ports and external gateways (intPortBroadcastVec register) and rebroadcasts it through all outward XAUI links except for the link it came in on. Note that it only broadcasts through laterals if the broadcastLateral register is set. It is unnecessary to broadcast laterals on most topologies, and doing so may reduce the number of duplicated broadcast packets by disabling it. It then adds this broadcast tag to the bcastIDSeen CAM in FIFO order. In FIG. 7, N04 1004 initiates a broadcast to all neighbors, i.e., N11 1105. N11 has not seen the packet, so it broadcasts to all non-incoming neighbors, which, in this example, are N21 1002, N20 1006, N03 1007, and N05 1008, and accepts the packet internally. Nodes N03 and N05 haven't seen the packet, so they accept the broadcast internally and are done. N21 hasn't seen the packet, so it broadcasts the packet to all active, non-incoming links (e.g., N10, N12 1009), and accepts the packet internally. N20 broadcasts the packet to all active, non-incoming links (i.e., N12), and accepts the packet internally. N10 broadcasts down to N00 1010, N01 1011, and N02 1012. N12 rebroadcasts to N06 1013, N07 1014, N08 1015 and to one of N21 and N20 (the one it didn't get the broadcast packet from). Note that one of N20 and N21, and N12, see the packet twice. They take action only on their first instance, the secondary times it hits the broadcast CAM as a duplicate, and the packet is ignored.

Unicast Routing

Unicast to Other Node

Unicast routing (as shown in FIG. 7) is responsible for routing non-multicast (i.e. unicast) packets to the next node. This is done by utilizing a software computed unicastRoute[ ] next node routing table that provides a vector of available links to get to the destination node.

Condition rframe.rfType==Unicast

Routing

There are substantial complexities related to routing around faults. Fault free routing and routing around faults will be discussed separately.

Traditionally in tree routing, the packet will be routed upward until a common parent of (source, destination) is reached. This upward routing can be deterministic, oblivious, or adaptive. The packet is then routed downward to the destination using deterministic routing.

As an example, FIG. 7 illustrates a packet routing from node N00 1010 to N08 1015. The packet is routed in the upward phase to the common ancestor (N21) through node N10 1001, and then a descent phase to the destination.

Note that during the upward phase at node N10, there are two candidate links (N10,N21) and (N10,N20). The first candidate link could be chosen deterministically, or an adaptive algorithm could dynamically select either of the links. But, once the node reaches the common ancestor and turns downward, there are no redundant paths (in general) for the node to reach the destination.

Unicast Routing in the Presence of No Faults

Each link is annotated within this unicastRoute table with a 2-bit linkWeight where software can express the relative cost/distance to the destination node via this link. By convention, link weights should represent:
- 0=No route
- 3=Direct next-hop connection
- 1 and 2=Software computed relative costs. As an example if there are routes across 3 links with costs of 2 hops, 3 hops, and 6 hops, the first two links could be assigned weight=2 and the 6 hops path could be assigned weight=1.

Algorithm for Fault-Free Unicast Routing:
- Get link weight vector from the unicast routing table linkWeightVector=unicastRoute[rframe.dstNode]
- Remove link that it came in on to remove possibility of sending it back
- Remove any links that are not up
- At this point, have a candidate list of links with associated link weights.
- Iterate through link weights, starting with highest priority (3) down through 1. Gather candidate list of links at this priority, stopping once the candidate list has at least one link. The result is a candidate list of links at the highest priority. As an example, if there are 2 links at weight=2, and 2 links at weight=1, the prioritized candidate list will contain the two links at weight=2.
- The adaptive register is checked to determine whether to do adaptive or deterministic routing.
  - adaptive==0 indicates that deterministic routing is to be used, so the first link is chosen from the prioritized candidate list.
  - adaptive==1 indicates that adaptive routing is to be used. The switch implementation will choose an algorithm for adaptively choosing the target link from the prioritized candidate list. This adaptive algorithm could be as simple as round-robin around the list. Alternatively, may choose to factor in other attributes e.g. FIFO free depth, link speed, . . .
    - An implementation option could be to add a register option to allow the router to adaptively choose from all non-zero weights, or to only adaptively choose from the highest priority candidate lists.
- The packet is sent out the selected link.

Fault-Resilient Unicast Routing

A couple of issues contribute to the complexity of fault-resilient unicast routing:
- The desire to do fault routing with only localized knowledge. A node implicitly knows that a link is down to a neighbor node. We choose a design to avoid having to communicate that a link (or node) goes down elsewhere in the fabric due to the complexities of maintaining a global, unified state in the presence of failures.
- The nature of routing in a tree. During the ascent phase of packet routing, links can be adaptively chosen from redundant links so it can be straightforward to avoid a link with the normal adaptive link selection.
- But, once the packet starts descending, traditionally there is not redundant paths for the descent path (that follow the routing rules), so fault routing can become challenging.

Figure 8:
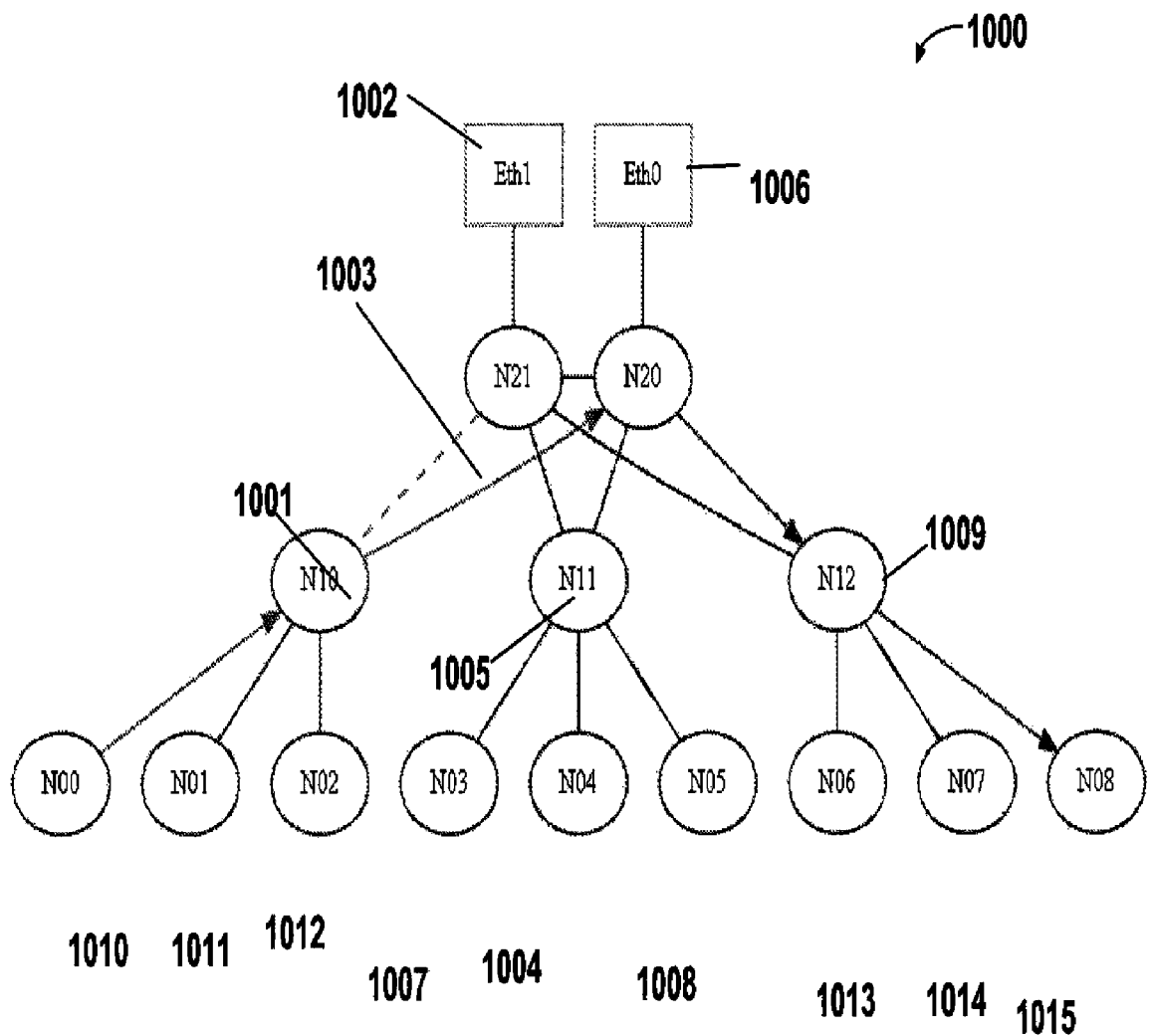
FIG. 8 illustrates an example of fault-resistant unicast routing of the network aggregation system.

FIG. 8 illustrates a link failure (N10,N21) and unicast routing selected the (N10, N20) link using the normal adaptive routing algorithm previously described. But note, if the packet is routed up to N20 and link (N20, N12) is down, it has no easy path to get to the destination. We have two approaches to handling routing around fails:
Software can compose alternative but non-desirable routes with weight=1. We'll call these escape routes. These are low priority routes that may violate the strict routing rules used during routing around faults. As an example, if the link (N20, N12) was down, the unicastRoute[N08] entry for N20 could contain link to N12 with weight=2 and a link to N11 with weight=1. In this way, the normal adaptive routing algorithms will automatically do the N00→N10→N21→N12→N08 path.

The fabric architecture includes a technique that we refer to as "misrouting". Misrouting provides for iterative backtracking Both of these techniques will provide substantial unicast fault-resilience.

Unicast Misrouting

Figure 9:
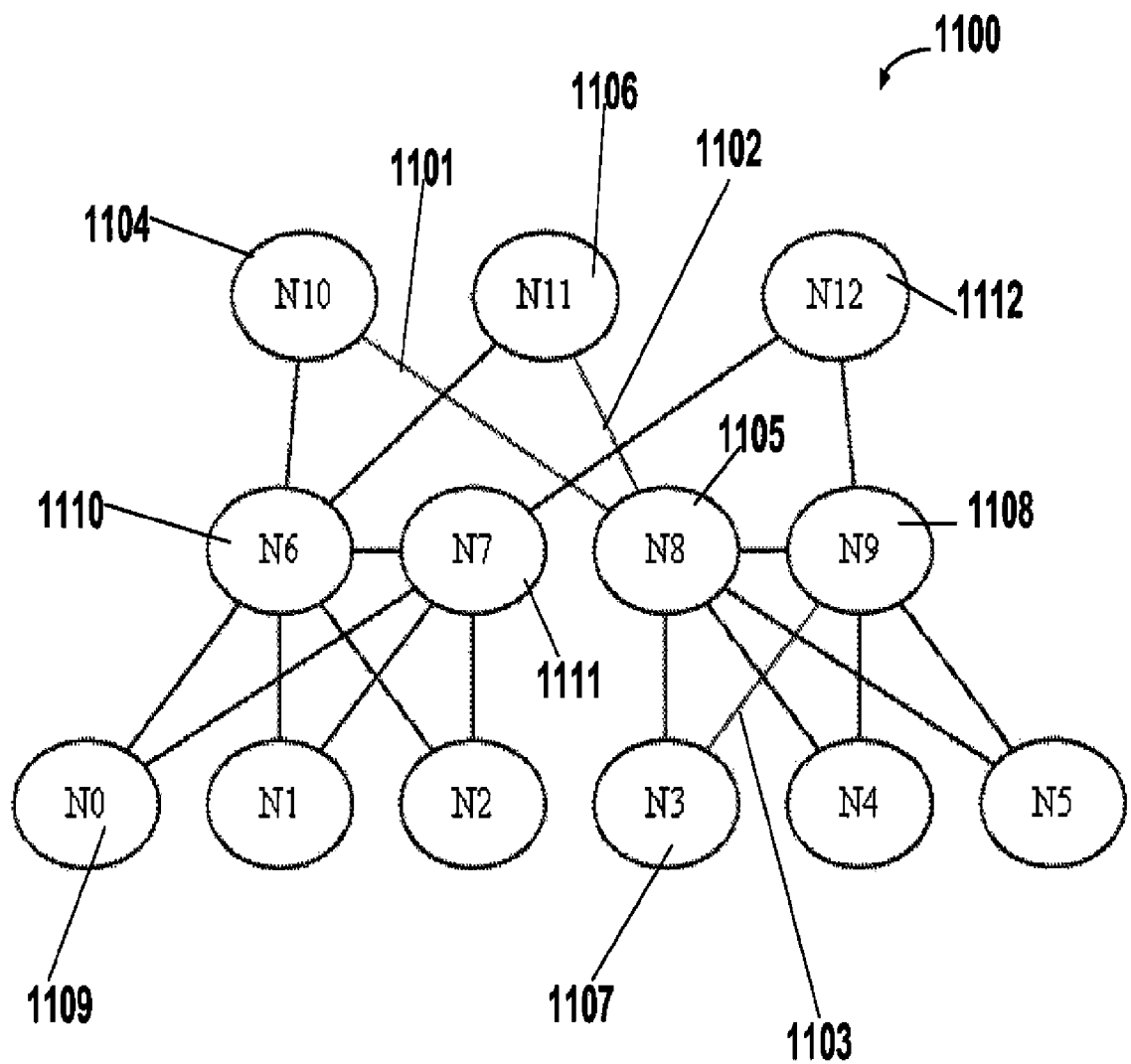
FIG. 9 illustrates a second embodiment of a broadcast mechanism of the network aggregation system.

As an example, consider the following topology, with 3 links 1101, 1102 and 1103 that have failed (shown in FIG. 9). Consider a unicast route from N0 to N3. We'll consider the following routing to understand the misrouting technique, understanding that this is only one of several routes that could have been chosen adaptively.
- Packet routed N0 to N6.
- Packet routed N6 to N10
- N10 sees that it has no paths to get to N3, other than the link it came in on. N10 sets the misrouting bit in the routing header, and sends it back to N6.
- N6 sees that the packet is being misrouted, sets the bit for the N10 link in the misrouteVector in the routing header, chooses an alternative link that has not been misrouted, and sends the packet to N11.
- N11 sees that it has no path to N3, other than the link it came in on. misrouting bit is already on, and sends it back to N6.
- N6 sees that the packet is being misrouted, adds N11 link to the misrouteVector (now contains N10 and N11 link IDs), chooses an alternative link that has not been misrouted, and sends it N7.
- N7 sees that the misrouting bit is set, but does have a valid link to N3 (to N12), and thus clears the misrouting bit in the header, and forwards the packet to N12.
- N12 sends to N9.
- N9 unicastRoute now likely contains link to N3 (weight=3) and link to N8 (weight=2). Normal adaptive routing will not choose the direct link to N3 since it's down, and will route the packet to N8, then finally to N3.

If N6 had exhausted its list of candidate links (meaning the misrouteVector masked them all), the implementation then has two choices:
- drop the packet and inform the M3 of the failure to route.
- clear the misrouteVector leaving misrouting set, and forward the packet through one of the downward facing links (if one exists). This will retry misrouting at one layer lower. The implementation may want to have a register bit (enableRecursiveMisrouting) to enable this retry at lower layer option.

There is a register enableMisrouting that allows software to control whether the switch will initiate the misrouting algorithm.

Multi-Domaining

Also known to the inventors is Multi-Domaining, whose goal is to increase the addressability of nodes to a large number of nodes (e.g., 64K nodes), without having to increase the size of the unicast routing table to 64K nodes.

As currently described, the unicast routing table is a single-dimension array indexed by node number (i.e. 0 to MAX_NODES−1), where a typical implementation will be between 256 and 4K nodes.

This section will now describe how the current architecture is altered to support multiple domains, with 64K max nodes.

The node namespace is changed from a node ID from 0 to MAX_NODES−1, to a 2-tuple of (domain ID, node ID), where both domain ID and node ID range from 0 to 255. So, there can effectively be 256 domains where each domain can contain up to 256 nodes.

The unicast routing table is changed from a single dimension table of size MAX_NODES, to a two-dimension table of size 256. The unicast routing table is now changed from a structure of unicastRoute[NODES] to unicastRoute[2][256].

Local domain routing: When routing to a node within this domain, the unicast routing table is accessed as unicastRoute[0] [node ID], and provides a weighted link vector to route to the specified node ID from the current node.

Remote domain routing: When routing to a node within a remote domain, the unicast routing table is accessed as unicastRoute[1][domain ID], and provides a weighted link vector to route to the specified domain ID from the current node.

Routing frame: One bit is added to the routing frame, dstRemote, which is set true when routing to a remote domain.

Locally administered MAC addresses: The section below describes the Node Encoded Unicast MAC address encoding as follows:

| Node Encoded Unicast | Unicast Locally administered OUI == Switch OUI | 10 bits: SS_MAC_NODE_ENCODED_MAGIC 12 bits: Node ID 2 bits: Port ID |
|---|---|---|

This gets altered for multi-domaining as follows:

| Node Encoded Unicast | Unicast Locally administered OUI == Switch OUI | 6 bits: SS_MAC_NODE_ENCODED_MAGIC 8 bits: Domain ID 8 bits: Node ID 2 bits: Port ID |
|---|---|---|

Creating the routing frame header: Table 2 describes the algorithms for creating the routing frame header. This is augmented in the multi-domaining case by:

```
if ( dstDomain == myDomainID ) {        // Route to local domain
    rframe.dstRemote = false;
    rframe.dstNode = dstNode;
}
else {                                   // Route to remote domain
    rframe.dstRemote = true;
    rframe.dstNode = dstDomain;
```

Network Proxy

The concept of network proxy is the ability of the main processors (FIG. 5A, 905) to maintain network presence while in a low-power sleep/hibernation state, and intelligently wake when further processing is required. There are several architectural features related to Network Proxy:

There is a CSR (portRemap) to allow the remapping of Port IDs. In effect, when the switch is to deliver a packet to an internal MAC0 port (e.g. FIG. 5A, 902), this Port Remapping CSR allows software to remap MAC0 to the management processor MAC (e.g. FIG. 5A, 907) and have the packet delivered to the management processor for Network Proxy processing. This remapping CSR could also be used to remap MAC1 traffic to MAC0, or MAC1 traffic to the management processor.

Normally, the switch looks at the destination node ID of the routing frame to decide whether the packet is delivered to an internal port within the node, or gets routed to other XAUI connected nodes. This is done by matching Destination Node ID to "My Node ID". The Node ID Match register (nodeRangeLo, nodeRangeHi) causes the packet to be delivered to an internal port within the node if nodeRangeLo<=Destination_Node<=nodeRange Hi¡¡myNodeID==Destination_Node. This allows a node to proxy for a subtree of nodes.

A typical use sequence would be of the Form:

Management processor maintains the IP to MAC address mappings for MAC0 and MAC1 on the node. This can be done via either explicit communication of these mappings from the main processor OS to the management processor, or can be done implicitly by having the management processor snoop local gratuitous ARP broadcasts.

The main processor coordinates with the management processor to go to a low power dormant state. During this transition, the management processor sets up the Port ID remapping CSR to route MAC0 and MAC1 traffic to the management processor.

The management processor processes any incoming MAC0/MAC1 packets. There are 3 categories of processing:

Respond to some classes of transactions that require simple responses (e.g. ARP responses and ICMP ping).

Dump and ignore some classes of packets, typically unicast or broadcast packets that are targeting other computers.

Decide that the main processor must be woken to process some classes of packets. The management processor will wake the main processor, undo the Port ID remapping register, and re-send the packets back through the switch where they will get rerouted back to MAC0/1.

Wake-on-LAN Magic Packet

In a traditional desktop computer, the computer to be woken is shut down (sleeping, hibernating, or soft off; i.e., ACPI state G1 or G2), with power reserved for the network card, but not disconnected from its power source. The network card listens for a specific packet containing its MAC address, called the magic packet, broadcast on the broadcast address for that particular subnet (or an entire LAN, though this requires special hardware or configuration). The magic packet is sent on the data link or layer 2 in the OSI model and broadcast to all NICs within the network of the broadcast address; the IP-address (layer 3 in the OSI model) is not used. When the listening computer receives this packet, the network card checks the packet for the correct information. If the magic packet is valid, the network card takes the computer out of hibernation or standby, or starts it up.

The magic packet is a broadcast frame containing anywhere within its payload: 6 bytes of ones (resulting in hexadecimal FF FF FF FF FF FF), followed by sixteen repetitions of the target computer's MAC address. Since the magic packet is only scanned for the string above, and not actually parsed by a full protocol stack, it may be sent as a broadcast packet of any network- and transport-layer protocol. It is typically sent as a UDP datagram to port 0, 7 or 9, or, in former times, as an IPX packet.

Using the Network Proxy architecture just described, the management processor can support these Wake-On-LAN packets. It will get these broadcast packets, will know the MAC addresses for the other MACs on the node, and be able to wake up the main processor as appropriate. No further functionality is needed in the switch to support these Wake-on-LAN packets.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A switch system, comprising:
a plurality of nodes, wherein each node includes a computational processor and an embedded switch;
a plurality of links associated with each node, wherein the plurality of links are configured to connect nodes in the plurality of nodes to create a topology of a switch fabric for routing data through the plurality of nodes;
a management processor in at least one of the plurality of nodes, wherein the management processor is configure to control the routing of data through the switch fabric; and
at least one routing header processor in at least one of the plurality of nodes, wherein the at least one routing header processor is configured to generate a routing frame header for a frame packet using a routing table, wherein the routing frame header includes a domain identifier and a management domain state associated with a media access control (MAC) layer that generated the routing frame header, and wherein the routing table includes a neighbor multicast entry so that one or more packets can be sent through a link to neighboring nodes.

2. A switch system, comprising:
a plurality of nodes, wherein each node has a switch;
a plurality of links associated with each node, wherein the plurality of links are configured to connect nodes in the plurality of nodes to create a topology of a switch fabric for routing data through the plurality of nodes;
a management processor in at least one of the nodes, wherein the management processor is configured to control the routing of data through the switch fabric; and
at least one routing header processor at each switch, wherein the at least one routing header processor is configured to access a content addressable memory with a tag to determine if an incoming broadcast packet has crossed through a particular switch, and wherein, if the incoming broadcast packet has not crossed through the particular switch, the at least one routing header processor is configured to rebroadcast the incoming broadcast packet through all links connected to a node that includes the particular switch.

3. A method comprising:
controlling, using a management processor in one of a plurality of nodes of a fabric switch, routing of data through the switch fabric; and
generating, by at least one routing header processor in one of the plurality of nodes, a routing frame header for a frame packet using a routing table, wherein the routing frame header includes a domain identifier and a management domain state associated with a media access control (MAC) layer that generated the routing frame header, and wherein the routing table includes a neighbor multicast entry so that one or more packets can be sent through a link to neighboring nodes.

4. A method comprising:
controlling, using a management processor of a fabric switch that includes a plurality of nodes, routing of data through the switch fabric;
accessing, by at least one routing header processor in the fabric switch, a content addressable memory with a tag to determine if an incoming broadcast packet has crossed through a particular switch; and
rebroadcasting, if the incoming broadcast packet has not crossed through the particular switch, the incoming broadcast packet through all links connected to a node that includes the particular switch.

5. The switch system of claim 1, wherein the frame packet includes the routing frame header and a core portion of an Ethernet frame.

6. The switch system of claim 1, wherein the at least one routing header processor is configured to convert the frame packet to an Ethernet packet.

7. The switch system of claim 6, wherein the conversion is performed as the frame packet is entering or leaving the fabric switch.

8. The switch system of claim 2, wherein the tag includes a broadcast identifier.

9. The switch system of claim 2, wherein the at least one routing header processor is configured to standardize one or more fields in the incoming broadcast packet.

10. The switch system of claim 9, wherein the one or more fields include a preamble field, a start of frame field, and an inter-frame gap field.

11. The switch system of claim 2, wherein the at least one routing header processor is configured to add one or more fields to the incoming broadcast packet such that the incoming broadcast packet can be received by the fabric switch.

12. The switch system of claim 11, wherein the at least one routing header processor is further configured to strip the one or more fields from the incoming broadcast packet before the incoming broadcast packet leaves the fabric switch.

13. The method of claim 3, wherein the frame packet includes the routing frame header and a core portion of an Ethernet frame.

14. The method of claim 3, further comprising converting, by the at least one routing header processor, the frame packet to an Ethernet packet.

15. The method of claim 14, wherein the conversion is performed as the frame packet is entering or leaving the fabric switch.

16. The method of claim 4, wherein the tag includes a broadcast identifier.

17. The method of claim 4, further comprising standardizing, by the at least one routing header processor, one or more fields in the incoming broadcast packet.

18. The method of claim 17, wherein the one or more fields include a preamble field, a start of frame field, and an inter-frame gap field.

19. The method of claim 4, further comprising adding, by the at least one routing header processor, one or more fields to the incoming broadcast packet such that the incoming broadcast packet can be received by the fabric switch.

20. The method of claim 19, further comprising stripping, by the at least one routing header processor, the one or more fields from the incoming broadcast packet before the incoming broadcast packet leaves the fabric switch.

* * * * *